US008970965B2

(12) United States Patent
Tomotoshi et al.

(10) Patent No.: US 8,970,965 B2
(45) Date of Patent: Mar. 3, 2015

(54) DISPLAY ELEMENT AND ELECTRIC APPARATUS USING SAME

(75) Inventors: Takuma Tomotoshi, Osaka (JP); Shun Ueki, Osaka (JP); Toshiki Matsuoka, Osaka (JP); Kohzoh Nakamura, Osaka (JP); Tomoko Teranishi, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 152 days.

(21) Appl. No.: 13/807,978

(22) PCT Filed: Apr. 6, 2011

(86) PCT No.: PCT/JP2011/058683
§ 371 (c)(1),
(2), (4) Date: Jan. 2, 2013

(87) PCT Pub. No.: WO2012/002013
PCT Pub. Date: Jan. 5, 2012

(65) Prior Publication Data
US 2013/0107348 A1    May 2, 2013

(30) Foreign Application Priority Data

Jul. 1, 2010   (JP) .................. 2010-151132
Dec. 7, 2010   (JP) .................. 2010-272314

(51) Int. Cl.
*G02B 26/00*   (2006.01)

(52) U.S. Cl.
CPC ............. *G02B 26/00* (2013.01); *G02B 26/005* (2013.01); *G02B 2207/113* (2013.01); *G02B 2207/115* (2013.01)
USPC ......................................... 359/665; 359/291

(58) Field of Classification Search
CPC ............... G02B 26/004; G02B 26/005; G02B 2207/115; G02B 3/14; G09G 3/348
USPC ........ 345/55, 61, 72, 107; 359/228, 290, 291, 359/665, 666
See application file for complete search history.

(56) References Cited

U.S. PATENT DOCUMENTS

| 2009/0034054 A1 | 2/2009 | Ikegami et al. |
| 2009/0079689 A1* | 3/2009 | Miyata et al. .................. 345/107 |
| 2010/0177022 A1 | 7/2010 | Teranishi et al. |

FOREIGN PATENT DOCUMENTS

| JP | 2004-144998 | 5/2004 |
| WO | WO 2007/013682 | 2/2007 |
| WO | WO 2008/155925 | 12/2008 |

OTHER PUBLICATIONS

International Search Report for PCT/JP2011/058683 mailed May 24, 2011.

* cited by examiner

*Primary Examiner* — Ricky Mack
*Assistant Examiner* — Gary ONeill
(74) *Attorney, Agent, or Firm* — Nixon & Vanderhye, P.C.

(57) ABSTRACT

A display element (10) includes an upper substrate (first substrate) (2), a lower substrate (second substrate) (3), and a polar liquid (16) that is sealed in a display space (S) formed between the upper substrate (2) and the lower substrate (3) so as to be moved toward an effective display region (P1) or a non-effective display region (P2). A rib (14) hermetically divides the inside of the display space (S) in accordance with each of a plurality of pixel regions (P). A movement space (K) in which an oil (insulating fluid) (17) is moved is provided for each of the pixel regions (P).

20 Claims, 16 Drawing Sheets

DISPLAY ELEMENT AND ELECTRIC APPARATUS USING SAME

This application is the U.S. national phase of International Application No. PCT/JP2011/058683 filed 6 Apr. 2011 which designated the U.S. and claims priority to JP 2010-151132 filed 1 Jul. 2010, and JP 2010-272314 filed 7 Dec. 2010 the entire contents of each of which are hereby incorporated by reference.

TECHNICAL FIELD

The present invention relates to a display element that displays information such as images and characters by moving a polar liquid, and an electric apparatus using the display element.

BACKGROUND ART

In recent years, as typified by an electrowetting type display element, a display element that displays information by utilizing a transfer phenomenon of a polar liquid due to an external electric field has been developed and put to practical use.

Specifically, in such a conventional display element, a display space is formed between first and second substrates, and the inside of the display space is divided by ribs (partitions) in accordance with a plurality of pixel regions (see, e.g., Patent Document 1). Moreover, a conductive liquid (polar liquid) is sealed in each of the pixel regions, and signal electrodes are arranged so as to cross scanning electrodes and standard electrodes (reference electrodes) that are parallel to each other. In this conventional display element, voltages are appropriately applied to the signal electrodes, the scanning electrodes, and the standard electrodes, so that the conductive liquid is moved to the scanning electrode side or the standard electrode side in each of the pixel regions, thereby changing the display color on a display surface.

PRIOR ART DOCUMENTS

Patent Documents

Patent Document 1: WO 2008/155925 A1

DISCLOSURE OF INVENTION

Problem to be Solved by the Invention

In the above conventional display element, the amount of the movement of the conductive liquid (polar liquid) is changed by adjusting the magnitude of the voltage applied to the signal electrodes, and thus the display color on the display surface is turned into a halftone, i.e., so-called gradation display is performed.

However, in the conventional display element, there is a possibility that the display color cannot be changed with high precision. In particular, when the gradation display is performed, the conductive liquid cannot be moved precisely to a desired position, and a subtle color shift occurs, which may result in low display quality.

Specifically, in the conventional display element, each of the pixel regions is not fully enclosed by the ribs in order to improve the speed of the movement of the conductive liquid inside the pixel region. For example, in the case of a rectangular pixel region, clearances through which the adjacent pixel regions can communicate with each other are provided in four corners of the pixel region. Moreover, an oil (insulating fluid) that is not mixed with the conductive liquid is movably sealed in each of the pixel regions to improve the speed of the movement of the conductive liquid. Therefore, in the conventional display element, depending on the size of the clearances, the materials of the conductive liquid and the oil, the speed of the movement of the conductive liquid, etc., the conductive liquid may be slightly moved due to the oil that has flowed from the adjacent pixel regions.

Moreover, when the next display operation is performed while the conductive liquid is slightly moved as described above, the conductive liquid may not be moved precisely to the position where it is to be located in the next display operation, even if a voltage corresponding to that display operation is properly applied to the signal electrode. Consequently, the conventional display element may cause a subtle color shift and reduce the display quality.

With the foregoing in mind, it is an object of the present invention to provide a display element that can prevent a reduction in the display quality even if gradation display is performed, and an electric apparatus using the display element.

Means for Solving Problem

To achieve the above object, a display element of the present invention includes the following: a first substrate provided on a display surface side; a second substrate provided on a non-display surface side of the first substrate so that a predetermined display space is formed between the first substrate and the second substrate; an effective display region and a non-effective display region that are defined with respect to the display space; and a polar liquid sealed in the display space so as to be moved toward the effective display region or the non-effective display region. The display element is capable of changing a display color on the display surface side by moving the polar liquid. The display element includes the following: a plurality of signal electrodes that are placed in the display space so as to come into contact with the polar liquid, and are also provided along a predetermined arrangement direction; a plurality of reference electrodes that are provided on one of the first substrate and the second substrate so as to be electrically insulated from the polar liquid and to be located on one of the effective display region side and the non-effective display region side, and are also arranged so as to intersect with the plurality of the signal electrodes; a plurality of scanning electrodes that are provided on one of the first substrate and the second substrate so as to be electrically insulated from the polar liquid and the plurality of the reference electrodes and to be located on the other of the effective display region side and the non-effective display region side, and are also arranged so as to intersect with the plurality of the signal electrodes; a plurality of pixel regions that are located at each of the intersections of the plurality of the signal electrodes and the plurality of the scanning electrodes; a rib that is provided on at least one of the first substrate and the second substrate so as to hermetically divide the inside of the display space in accordance with each of the plurality of the pixel regions; and an insulating fluid that is not mixed with the polar liquid and is movably sealed in the display space for each of the plurality of the pixel regions. A movement space in which the insulating fluid is moved is provided in the display space for each of the plurality of the pixel regions.

In the display element having the above configuration, the inside of the display space is hermetically divided by the rib in accordance with each of the pixel regions. Therefore, unlike the conventional example, the display element can prevent the flow of the insulating fluid from the adjacent pixel regions, and thus can prevent a slight movement of the polar liquid due to the insulating fluid from the adjacent pixel regions. Moreover, the movement space in which the insulating fluid is moved is provided in the display space for each of the pixel regions. Therefore, when the polar liquid is moved to change the display color, this polar liquid can be moved smoothly and properly. Thus, the display element can prevent a reduction in the display quality even if the gradation display is performed.

In the above display element, the movement space may be partitioned in the display space by using a plurality of protruding members that are provided on the other of the first substrate and the second substrate so as to protrude into the display space, and that are spaced at predetermined intervals.

In this case, the movement space can be appropriately provided in the display space by the plurality of protruding members.

In the above display element, it is preferable that in the plurality of the protruding members, a distance between two adjacent protruding members and a distance between the rib and the protruding member that is adjacent to said rib are each set to be smaller than a size of the polar liquid in a direction perpendicular to the first substrate and the second substrate.

This configuration can prevent the motion of the polar liquid from becoming unstable.

In the above display element, it is preferable that a guide portion is provided in the movement space with one end located in the effective display region and the other end located in the non-effective display region, and guides the insulating fluid to the effective display region side or the non-effective display region side in accordance with the movement of the polar liquid.

In this case, the insulating fluid is guided through the guide portion to the effective display region side or the non-effective display region side in accordance with the movement of the polar liquid. Therefore, when the polar liquid is moved to change the display color, this polar liquid can be moved more smoothly and properly. Consequently, the display element with excellent display quality can be easily provided.

In the above display element, the guide portion may include a plurality of rail members that are linearly provided on the other of the first substrate and the second substrate so as to protrude into the display space and also to connect the effective display region and the non-effective display region, and that are spaced at predetermined intervals.

In this case, the insulating fluid can be appropriately guided through the rail members to the effective display region side or the non-effective display region side in accordance with the movement of the polar liquid.

In the above display element, it is preferable that in the plurality of the rail members, a distance between two adjacent rail members and a distance between the rib and the rail member that is adjacent to said rib are each set to be smaller than a size of the polar liquid in a direction perpendicular to the first substrate and the second substrate.

This configuration can prevent the motion of the polar liquid from becoming unstable.

In the above display element, it is preferable that the guide portion includes a plate member that is connected to each of edges of the plurality of the rail members so as to face the other of the first substrate and the second substrate, and that has a planar shape so as to be in contact with the polar liquid in the display space.

This configuration ensures that the movement space can be formed between the plate member, the plurality of the rail members, and the other of the first substrate and the second substrate. Moreover, since the plate member has a planar shape so as to be in contact with the polar liquid in the display space, the polar liquid can be moved more reliably and stably.

In the above display element, it is preferable that a distance between the rib and the plate member is set to be smaller than the size of the polar liquid in the direction perpendicular to the first substrate and the second substrate.

This configuration can prevent the motion of the polar liquid from becoming unstable.

In the above display element, the guide portion may include two rail members that are linearly provided on at least one of the first substrate and the second substrate so as to protrude into the display space and also to connect the effective display region and the non-effective display region, and that are spaced a predetermined distance apart so as to sandwich the polar liquid.

This configuration ensures that the space outside the two rail members can be used as the movement space. Therefore, when the display color is changed, a smooth movement of the insulating fluid and the polar liquid can be reliably achieved.

In the above display element, it is preferable that a distance h10 between the rib and an end of each of the two rail members in a direction of movement of the polar liquid is set so as to satisfy the following inequality (1):

$$0.02 \times A \leq h10 \leq 0.17 \times A \quad (1)$$

where A represents a size of the pixel region in the direction of the movement of the polar liquid.

In this case, both the polar liquid and the insulating fluid can be moved smoothly.

In the above display element, it is preferable that a size h of each of the two rail members in a direction perpendicular to the first substrate and the second substrate is set so as to satisfy the following inequality (2):

$$0.65 \times H \leq h \leq H \quad (2)$$

where H represents a size of the polar liquid in the direction perpendicular to the first substrate and the second substrate.

In this case, the polar liquid can be reliably sandwiched between the two rail members, and thus can be moved more properly.

It is preferable that the above display element includes the following: a signal voltage application portion that is connected to the plurality of the signal electrodes and applies a signal voltage in a predetermined voltage range to each of the plurality of the signal electrodes in accordance with information to be displayed on the display surface side; a reference voltage application portion that is connected to the plurality of the reference electrodes and applies one of a selected voltage and a non-selected voltage to each of the plurality of the reference electrodes, the selected voltage allowing the polar liquid to move in the display space in accordance with the signal voltage and the non-selected voltage inhibiting a movement of the polar liquid in the display space; and a scanning voltage application portion that is connected to the plurality of the scanning electrodes and applies one of a selected voltage and a non-selected voltage to each of the plurality of the scanning electrodes, the selected voltage allowing the polar liquid to move in the display space in accordance with the signal voltage and the non-selected voltage inhibiting a movement of the polar liquid in the display space.

In this case, a matrix-driven display element with excellent display quality can be easily provided, and the display color of each of the pixel regions can be appropriately changed.

In the above display element, the plurality of the pixel regions may be provided in accordance with a plurality of colors that enable full-color display to be shown on the display surface side.

In this case, the color image display can be performed by moving the corresponding polar liquid properly in each of the pixels.

In the above display element, it is preferable that a dielectric layer is formed on the surfaces of the plurality of the reference electrodes and the plurality of the scanning electrodes.

In this case, the dielectric layer reliably increases the electric field applied to the polar liquid, so that the speed of the movement of the polar liquid can be more easily improved.

In the above display element, the non-effective display region may be defined by a light-shielding layer that is provided on one of the first substrate and the second substrate, and the effective display region may be defined by an aperture formed in the light-shielding layer.

In this case, the effective display region and the non-effective display region can be properly and reliably defined with respect to the display space.

An electric apparatus of the present invention includes a display portion that displays information including characters and images. The display portion includes any of the above display elements.

In the electric apparatus having the above configuration, the display portion uses the display element that can prevent a reduction in the display quality even if the gradation display is performed. Thus, a high-performance electric apparatus including the display portion with excellent display quality can be easily provided.

Effects of the Invention

The present invention can provide a display element that can prevent a reduction in the display quality even if gradation display is performed, and an electric apparatus using the display element.

DESCRIPTION OF THE INVENTION

Figure 1:
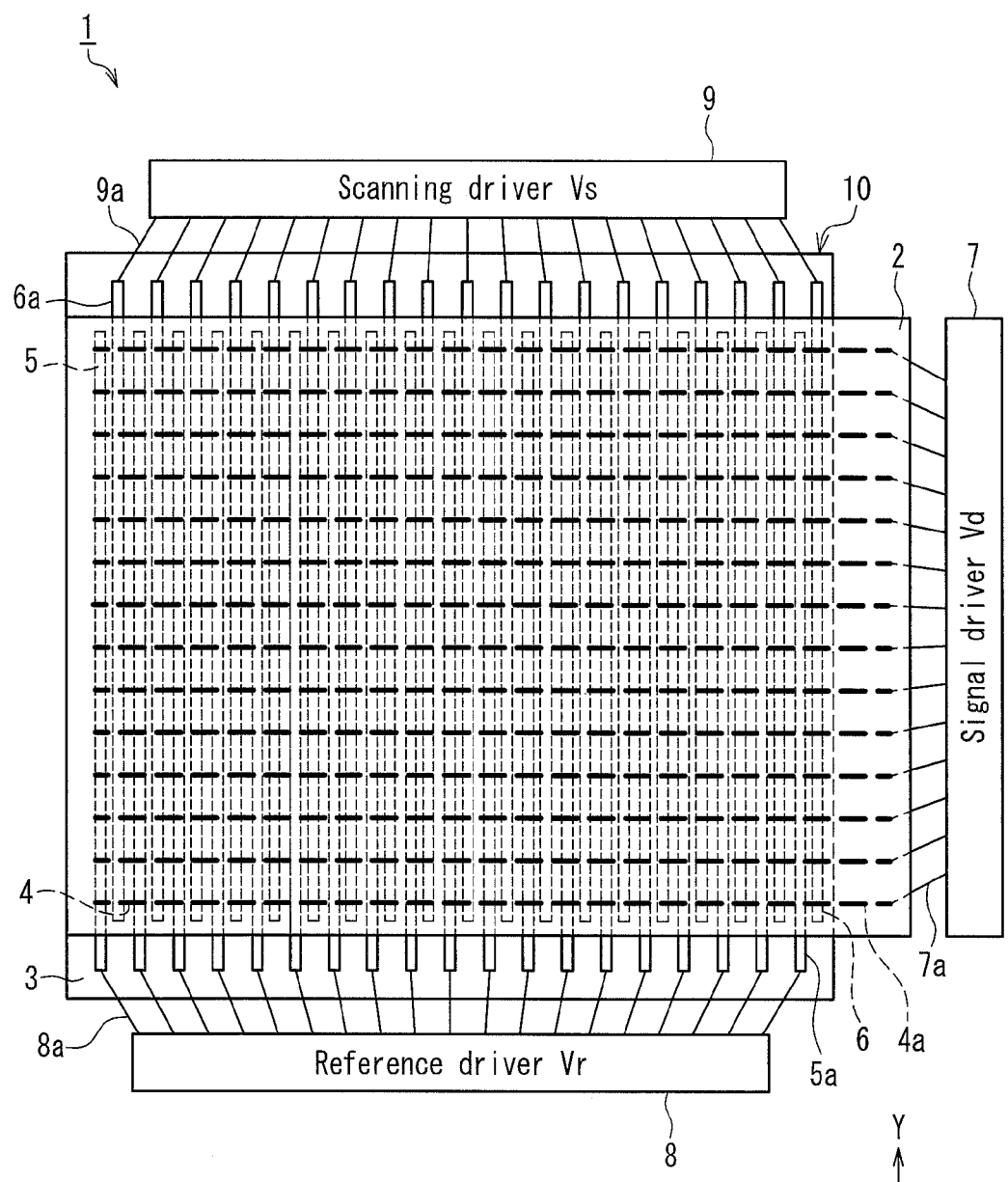
FIG. 1 is plan view for explaining a display element and an image display apparatus of Embodiment 1 of the present invention.

Hereinafter, preferred embodiments of a display element and an electric apparatus of the present invention will be described with reference to the drawings. In the following description, the present invention is applied to an image display apparatus including a display portion that can display color images. The size and size ratio of each of the constituent members in the drawings do not exactly reflect those of the actual constituent members.

Embodiment 1

FIG. 1 is a plan view for explaining a display element and an image display apparatus of Embodiment 1 of the present invention. In FIG. 1, an image display apparatus 1 of this embodiment includes a display portion using a display element 10 of the present invention. The display portion has a rectangular display surface. The display element 10 includes an upper substrate 2 and a lower substrate 3 that are arranged to overlap each other in a direction perpendicular to the sheet of FIG. 1. The overlap between the upper substrate 2 and the lower substrate 3 forms an effective display region of the display surface (as will be described in detail later).

In the display element 10, a plurality of signal electrodes 4 are spaced at predetermined intervals and arranged in stripes in the X direction. Moreover, in the display element 10, a plurality of reference electrodes 5 and a plurality of scanning electrodes 6 are alternately arranged in stripes in the Y direction. The plurality of the signal electrodes 4 intersect with the plurality of the reference electrodes 5 and the plurality of the scanning electrodes 6, and a plurality of pixel regions are located at each of the intersections of the signal electrodes 4 and the scanning electrodes 6.

The signal electrodes 4, the reference electrodes 5, and the scanning electrodes 6 are configured so that voltages can be independently applied to these electrodes, and the voltages fall in a predetermined voltage range between a High voltage (referred to as "H voltage" in the following) that serves as a first voltage and a Low voltage (referred to as "L voltage" in the following) that serves as a second voltage (as will be described in detail later).

In the display element 10, the pixel regions are hermetically separated from one another by a rib (partition) and provided in accordance with a plurality of colors that enable full-color display to be shown on the display surface, as will be described in detail later. The display element 10 changes the display color on the display surface by moving a polar liquid (as will be described later) for each of a plurality of pixels (display cells) arranged in a matrix using an electrowetting phenomenon.

One end of the signal electrodes 4, the reference electrodes 5, and the scanning electrodes 6 are extended to the outside of the effective display region of the display surface and form terminals 4a, 5a, and 6a, respectively.

A signal driver 7 is connected to the individual terminals 4a of the signal electrodes 4 via wires 7a. The signal driver 7 constitutes a signal voltage application portion and applies a signal voltage Vd to each of the signal electrodes 4 in accordance with information when the image display apparatus 1 displays the information including characters and images on the display surface.

A reference driver 8 is connected to the individual terminals 5a of the reference electrodes 5 via wires 8a. The reference driver 8 constitutes a reference voltage application portion and applies a reference voltage Vr to each of the reference electrodes 5 when the image display apparatus 1 displays the information including characters and images on the display surface.

A scanning driver 9 is connected to the individual terminals 6a of the scanning electrodes 6 via wires 9a. The scanning driver 9 constitutes a scanning voltage application portion and applies a scanning voltage Vs to each of the scanning electrodes 6 when the image display apparatus 1 displays the information including characters and images on the display surface.

The scanning driver 9 applies either a non-selected voltage or a selected voltage to each of the scanning electrodes 6 as the scanning voltage Vs. The non-selected voltage inhibits the movement of the polar liquid and the selected voltage allows the polar liquid to move in accordance with the signal voltage Vd. Moreover, the reference driver 8 is operated with reference to the operation of the scanning driver 9. The reference driver 8 applies either the non-selected voltage that inhibits the movement of the polar liquid or the selected voltage that allows the polar liquid to move in accordance with the signal voltage Vd to each of the reference electrodes 5 as the reference voltage Vr.

In the image display apparatus 1, the scanning driver 9 applies the selected voltage to each of the scanning electrodes 6 in sequence, e.g., from the left to the right of FIG. 1, and the reference driver 8 applies the selected voltage to each of the reference electrodes 5 in sequence from the left to the right of FIG. 1 in synchronization with the operation of the scanning driver 9. Thus, the scanning driver 9 and the reference driver 8 perform their respective scanning operations for each line (as will be described in detail later).

The signal driver 7, the reference driver 8, and the scanning driver 9 include a direct-current power supply or an alternating-current power supply that supplies the signal voltage Vd, the reference voltage Vr, and the scanning voltage Vs, respectively.

The reference driver 8 switches the polarity of the reference voltage Vr at predetermined time intervals (e.g., 1 frame). Moreover, the scanning driver 9 switches the polarity of the scanning voltage Vs in accordance with the switching of the polarity of the reference voltage Vr. Thus, since the polarities of the reference voltage Vr and the scanning voltage Vs are switched at predetermined time intervals, the localization of charges in the reference electrodes 5 and the scanning electrodes 6 can be prevented, compared to the case where the voltages with the same polarity are always applied to the reference electrodes 5 and the scanning electrodes 6. Moreover, it is possible to prevent the adverse effects of a display failure (after-image phenomenon) and low reliability (a reduction in life) due to the localization of charges.

The pixel structure of the display element 10 will be described in detail with reference to FIGS. 2 to 5 as well as FIG. 1.

Figure 2:
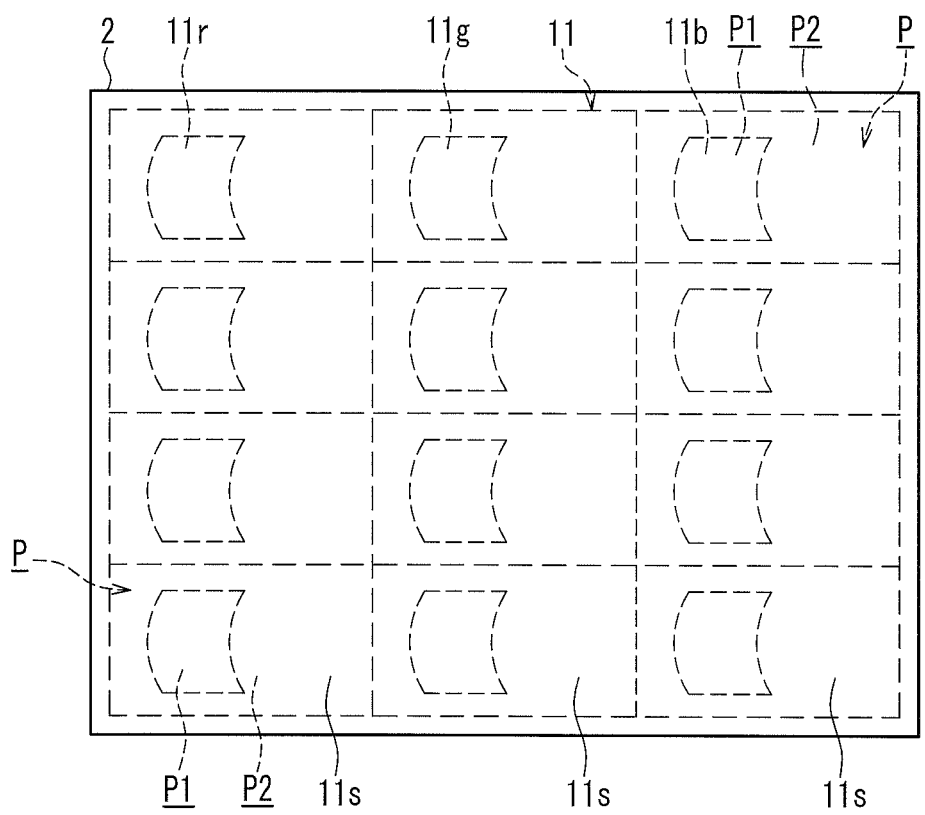
FIG. 2 is an enlarged plan view showing the main configuration of the upper substrate in FIG. 1 when viewed from a display surface side.
Figure 3:
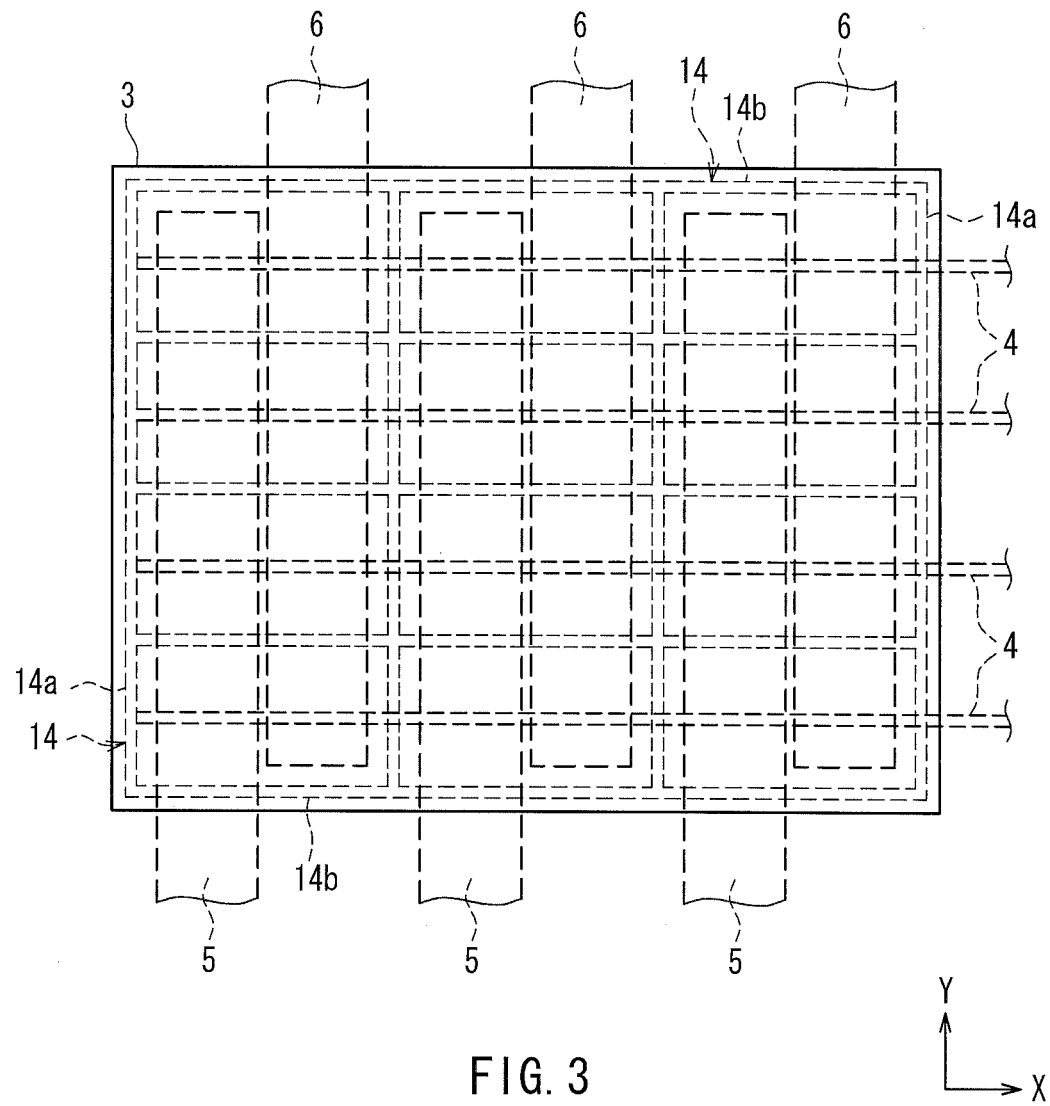
FIG. 3 is an enlarged plan view showing the main configuration of the lower substrate in FIG. 1 when viewed from a non-display surface side.
Figure 4A:
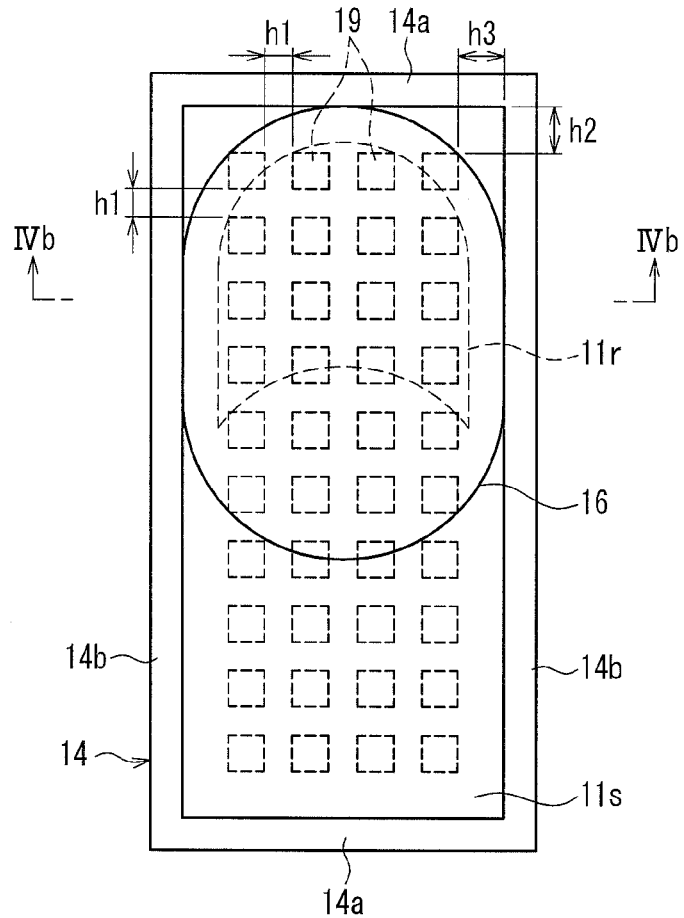
FIG. 4A is an enlarged plan view showing the main configuration in one pixel region of the display element.
Figure 4B:
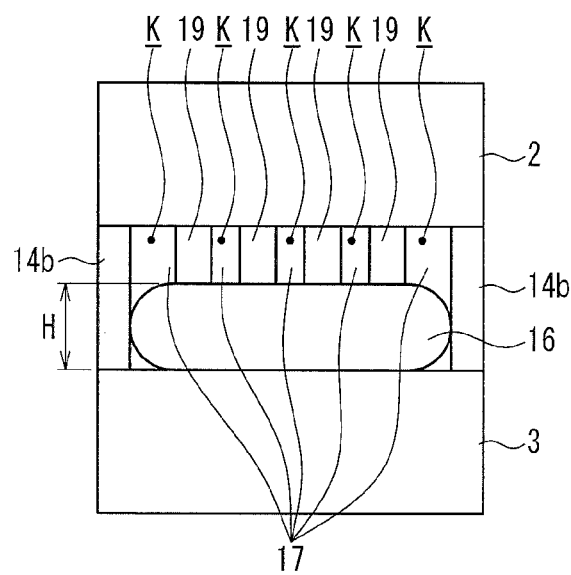
FIG. 4B is a cross-sectional view taken along the line IVb-IVb in FIG. 4A.
Figure 5A:
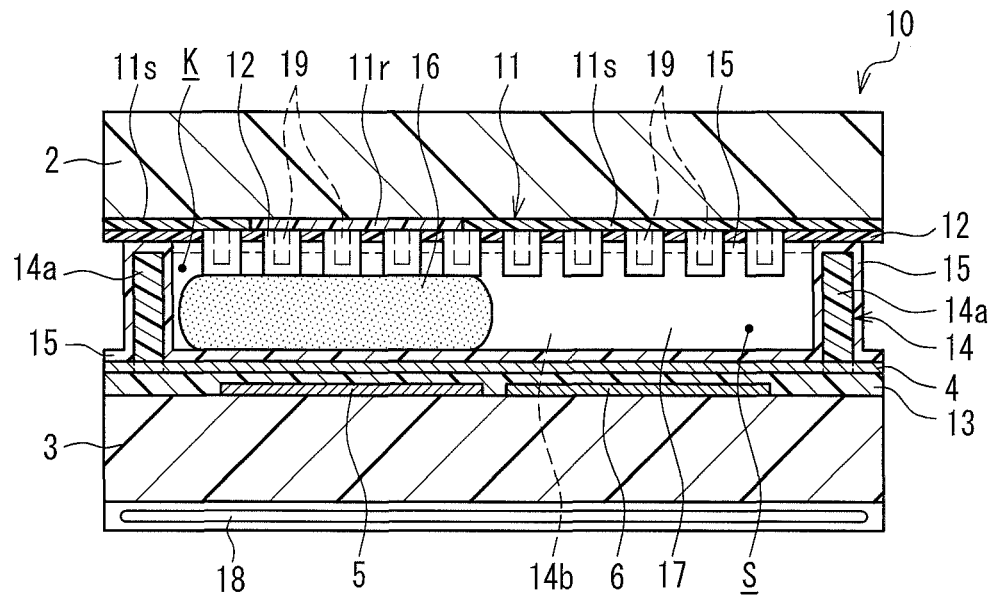
FIGS. 5A and 5B are cross-sectional views showing the main configuration of the display element in FIG. 1 during non-CF color display and CF color display, respectively.
Figure 5B:
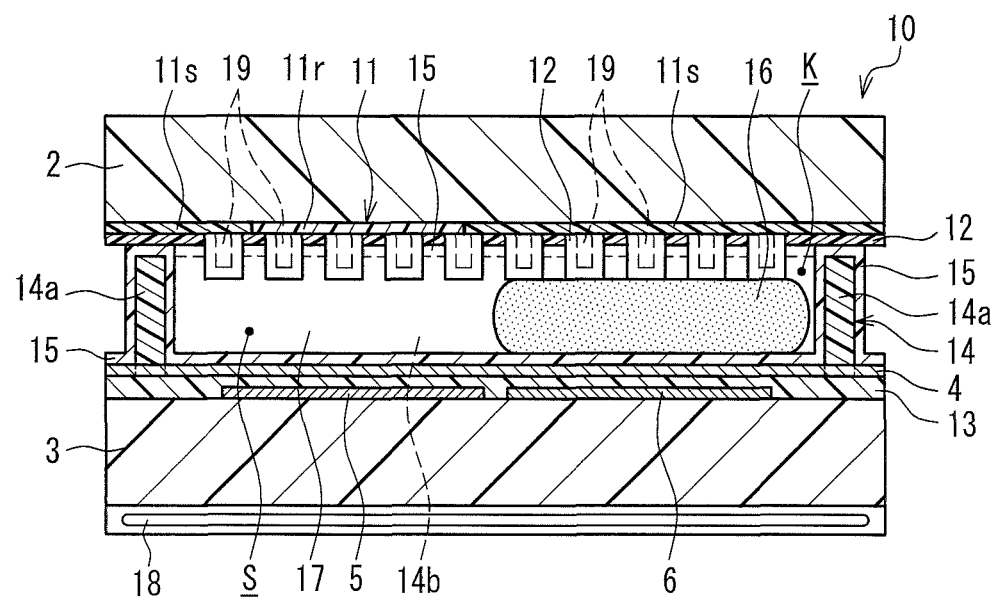

FIG. 2 is an enlarged plan view showing the main configuration of the upper substrate in FIG. 1 when viewed from the display surface side. FIG. 3 is an enlarged plan view showing the main configuration of the lower substrate in FIG. 1 when viewed from the non-display surface side. FIG. 4A is an enlarged plan view showing the main configuration in one pixel region of the display element. FIG. 4B is a cross-sectional view taken along the line IVb-IVb in FIG. 4A. FIGS. 5A and 5B are cross-sectional views showing the main configuration of the display element in FIG. 1 during non-CF color display and CF color display, respectively. For the sake of simplification, FIGS. 2 and 3 show twelve pixels placed at the upper left corner of the plurality of pixels on the display surface in FIG. 1. Moreover, for the sake of clarification, FIG. 2 omits protruding members (as will be described later) provided on the non-display surface side of the upper substrate.

In FIGS. 2 to 5, the display element 10 includes the upper substrate 2 that is provided on the display surface side and serves as a first substrate, and the lower substrate 3 that is provided on the back (i.e., the non-display surface side) of the upper substrate 2 and serves as a second substrate. In the display element 10, the upper substrate 2 and the lower substrate 3 are located at a predetermined distance away from each other, so that a predetermined display space S is formed between the upper substrate 2 and the lower substrate 3. The polar liquid 16 and an insulating oil 17 that is not mixed with the polar liquid 16 are sealed in the display space S and can be moved in the X direction (the lateral direction of FIG. 3). The polar liquid 16 can be moved toward an effective display region P1 or a non-effective display region P2, as will be described later.

Moreover, a movement space K in which the oil (insulating fluid) 17 is moved is provided in the display space S for each of the pixel regions P, as will be described in detail later. With this configuration, the oil 17 can be moved smoothly and properly toward the effective display region P1 or the non-effective display region P2 in accordance with the movement of the polar liquid 16.

The polar liquid 16 can be, e.g., an aqueous solution including water as a solvent and a predetermined electrolyte as a solute. Specifically, 1 mmol/L of potassium chloride (KCl) aqueous solution may be used as the polar liquid 16. Moreover, the polar liquid 16 is colored a predetermined color, e.g., black with a self-dispersible pigment.

The polar liquid 16 is colored black and therefore functions as a shutter that allows or prevents light transmission. When the polar liquid 16 is slidably moved in the display space S toward the reference electrode 5 (i.e., the effective display region P1) or the scanning electrode 6 (i.e., the non-effective display region P2), the display color of each pixel of the display element 10 is changed to black or any color of RBG, as will be described in detail later.

The oil 17 can be, e.g., a nonpolar, colorless, and transparent oil including one or more than one selected from a side-chain higher alcohol, a side-chain higher fatty acid, an alkane hydrocarbon, a silicone oil, and a matching oil. The oil 17 is moved in the movement space K, which is partitioned and located on the upper substrate 2 side in the display space S, as the polar liquid 16 is slidably moved.

The upper substrate 2 can be, e.g., a transparent glass material such as a non-alkali glass substrate or a transparent sheet material such as a transparent synthetic resin (e.g., an acrylic resin). A color filter layer 11 is formed on the surface of the upper substrate 2 that faces the non-display surface side. Moreover, a plurality of protruding members 19 are formed in a predetermined pattern on the color filter layer 11 on the surface of the upper substrate 2 that faces the non-display surface side, and partition the movement space K in the display space S (as will be described in detail later). Further, a hydrophobic film 12 is formed on the surface of the upper substrate 2 that faces the non-display surface side so as to cover the color filter layer 11 and the protruding members 19.

Like the upper substrate 2, the lower substrate 3 can be, e.g., a transparent glass material such as a non-alkali glass substrate or a transparent sheet material such as a transparent synthetic resin (e.g., an acrylic resin). The reference electrodes 5 and the scanning electrodes 6 are formed on the surface of the lower substrate 3 that faces the display surface side. Moreover, a dielectric layer 13 is formed to cover the reference electrodes 5 and the scanning electrodes 6. A rib 14 having ribs 14a and ribs 14b that are parallel to the Y direction and the X direction, respectively, is formed on the surface of the dielectric layer 13 that faces the display surface side. The rib 14 is configured to hermetically divide the inside of the display space S in accordance with the pixel regions P and form a frame for each of the pixel regions, as shown in FIG. 3.

In the lower substrate 3, the signal electrodes 4 are formed on the surface of the dielectric layer 13 so as to penetrate the ribs 14a. Further, a hydrophobic film 15 is formed to cover the signal electrodes 4, the dielectric layer 13, and the ribs 14a, 14b.

A backlight 18 that emits, e.g., white illumination light is integrally attached to the back (i.e., the non-display surface side) of the lower substrate 3, thus providing a transmission type display element 10. The backlight 18 uses a light source such as a cold cathode fluorescent tube or a LED.

The color filter layer 11 includes red (R), green (G), and blue (B) color filters 11r, 11g, and 11b and a black matrix 11s serving as a light-shielding layer, thereby constituting the pixels of R, G, and B colors. In the color filter layer 11, as shown in FIG. 2, the R, G, and B color filters 11r, 11g, and 11b are successively arranged in columns in the X direction, and each column includes four color filters 11r, 11g, and 11b in the Y direction. Thus, a total of twelve pixels are arranged in three columns (the X direction) and four rows (the Y direction).

As shown in FIG. 2, in each of the pixel regions P of the display element 10, any of the R, G, and B color filters 11r, 11g, and 11b is provided in a portion corresponding to the effective display region P1 of a pixel, and the black matrix 11s is provided in a portion corresponding to the non-effective display region P2 of the pixel. In other words, with respect to the display space S, the non-effective display region (non-aperture region) P2 is defined by the black matrix (light-shielding layer) 11s and the effective display region P1 is defined by an aperture (i.e., any of the color filters 11r, 11g, and 11b) formed in that black matrix 11s.

In the display element 10, the area of each of the color filters 11r, 11g, and 11b is the same as or slightly smaller than that of the effective display region P1. On the other hand, the area of the black matrix 11s is the same as or slightly larger than that of the non-effective display region P2. In FIG. 2, the boundary between two black matrixes 11s corresponding to the adjacent pixels is indicated by a dotted line to clarify the boundary between the adjacent pixels. Actually, however, no boundary is present between the black matrixes 11s of the color filter layer 11.

In the display element 10, the display space S is divided into the pixel regions P by the rib 14 serving as the partition as described above. Specifically, as shown in FIG. 3, the display space S of each pixel is partitioned by two opposing ribs 14a and two opposing ribs 14b, so that a frame-shaped rib 14 is provided for each of the pixel regions P. Moreover, in the display element 10, the top portions of the ribs 14a, 14b are in contact with the upper substrate 2, and thus the rib 14 is configured to hermetically divide the inside of the display space S in accordance with the pixel regions P. The ribs 14a, 14b are made of, e.g., an epoxy resin resist material.

The hydrophobic films 12, 15 are made of, e.g., a transparent synthetic resin, and preferably a fluoro polymer that functions as a hydrophilic layer for the polar liquid 16 when a voltage is applied. This can significantly change the wettability (contact angle) between the polar liquid 16 and each of the surfaces of the upper and lower substrates 2, 3 that face the display space S. Thus, the speed of the movement of the polar liquid 16 can be improved. The dielectric layer 13 can be, e.g., a transparent dielectric film containing parylene, a silicon nitride, a hafnium oxide, a zinc oxide, a titanium dioxide, or an aluminum oxide. A specific thickness of each of the hydrophobic films 12, 15 ranges from several tens of nanometers to several micrometers. A specific thickness of the dielectric layer 13 is several hundred nanometers. The hydrophobic film 15 does not electrically insulate the signal electrodes 4 from the polar liquid 16, and therefore not interfere with the improvement in responsibility of the polar liquid 16.

The reference electrodes 5 and the scanning electrodes 6 are made of, e.g., transparent electrode materials such as indium oxides (ITO), tin oxides ($SnO_2$), and zinc oxides (AZO, GZO, or IZO). The reference electrodes 5 and the scanning electrodes 6 are formed in stripes on the lower substrate 3 by a known film forming method such as sputtering.

The signal electrodes 4 can be, e.g., linear wiring that is arranged parallel to the X direction. The signal electrodes 4 are made of, e.g., a transparent electrode material such as ITO. Moreover, the signal electrodes 4 are placed on the dielectric layer 13 so as to extend substantially through the center of each of the pixel regions P in the Y direction while penetrating the ribs 14a, and further to come into electrical contact with the polar liquid 16 via the hydrophobic film 15. This can improve the responsibility of the polar liquid 16 during a display operation.

Hereinafter, the protruding members 19 and the movement space K will be described in detail with reference to FIGS. 4A and 4B. For the sake of simplification, FIG. 4B omits the signal electrode 4, the reference electrode 5, the scanning electrode 6, the color filter layer 11, the hydrophobic films 12, 15, and the dielectric layer 13 (the same is true for FIGS. 7B, 9B, 13B, 15B, and 16B in the following).

As shown in FIGS. 4A and 4B, a plurality of, e.g., 40 protruding members 19 are formed on the surface of the upper substrate 2 that faces the non-display surface side and are spaced at predetermined intervals. The protruding members 19 are made of, e.g., an epoxy resin resist material, and each of the protruding members 19 is in the form of a rectangular parallelepiped. The protruding members 19 are provided on the upper substrate 2 so as to protrude from the upper substrate 2 into the display space S, thereby partitioning the movement space K in the display space S. In the display element 10 of this embodiment, as shown in FIG. 4B, each of the pixel regions P has the movement space K in which the oil (insulating fluid) 17 is moved, and the movement space K is formed on the upper substrate 2 side in the display space S with respect to the space in which the polar liquid 16 is moved. Moreover, the protruding members 19 are not provided on the lower substrate 3, on which the signal electrodes 4, the reference electrodes 5, the scanning electrodes 6, and the dielectric layer 13 are formed. Therefore, the protruding members 19 do not interfere with the movement of the polar liquid 16 due to the electrowetting phenomenon.

In the protruding members 19, as shown in FIGS. 4A and 4B, a distance h1 between two adjacent protruding members 19, a distance h2 between the rib 14a and the protruding member 19 that is adjacent to that rib 14a, and a distance h3 between the rib 14b and the protruding member 19 that is adjacent to that rib 14b are each set to be smaller than a size H of the polar liquid 16 in the direction perpendicular to the upper substrate 2 and the lower substrate 3. Specifically, in this embodiment, each of the distances h1 to h3 is set to, e.g., 10 μm and the size H is set to, e.g., 40 μm.

As described above, this embodiment uses the distances h1 to h3 that are smaller than the size H, and thus can prevent the motion (movement) of the polar liquid 16 from becoming unstable. According to the experiments conducted by the present inventors, the above configuration can prevent the polar liquid 16 from entering a gap between two adjacent protruding members 19, a gap between the rib 14a and the protruding member 19 that is adjacent to that rib 14a, and a gap between the rib 14b and the protruding member 19 that is adjacent to that rib 14b. Consequently, this embodiment can prevent the motion of the polar liquid 16 from becoming unstable. The experiments conducted by the present inventors demonstrated that, e.g., when the distance h1 between two adjacent protruding members 19 was not less than the size H of the polar liquid 16, the polar liquid 16 entered the gap between the two adjacent protruding members 19, and the motion of the polar liquid 16 was not stable.

In each pixel of the display element 10 having the above configuration, as shown in FIG. 5A, when the polar liquid 16 is held between the color filter 11r and the reference electrode 5, light from the backlight 18 is blocked by the polar liquid 16, so that the black display (non-CF color display) is performed. On the other hand, as shown in FIG. 5B, when the polar liquid 16 is held between the black matrix 11s and the scanning electrode 6, light from the backlight 18 is not blocked by the polar liquid 16 and passes through the color filter 11r, so that the red display (CF color display) is performed.

Next, a display operation of the image display apparatus 1 of this embodiment having the above configuration will be described in detail with reference to FIG. 6 as well as FIGS. 1 to 5.

Figure 6:
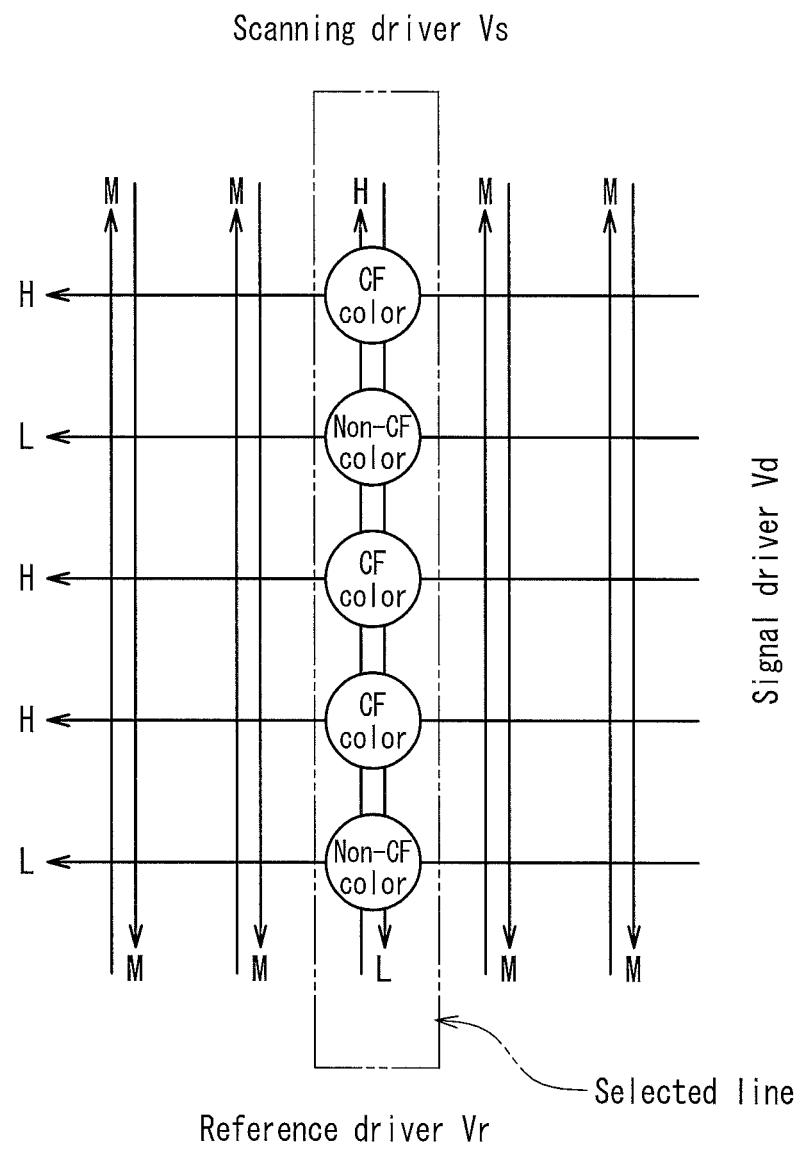
FIG. 6 is a diagram for explaining an operation example of the image display apparatus.

FIG. 6 is a diagram for explaining an operation example of the image display apparatus.

In FIG. 6, the reference driver 8 and the scanning driver 9 apply the selected voltages (i.e., the reference voltage Vr and the scanning voltage Vs) to the reference electrodes 5 and the scanning electrodes 6 in sequence in a predetermined scanning direction, e.g., from the left to the right of FIG. 6, respectively. Specifically, the reference driver 8 and the scanning driver 9 perform their scanning operations to determine a selected line by applying the H voltage (first voltage) and the L voltage (second voltage) as the selected voltages to the reference electrodes 5 and the scanning electrodes 6 in sequence, respectively. In this selected line, the signal driver 7 applies the H or L voltage (i.e., the signal voltage Vd) to the corresponding signal electrodes 4 in accordance with the external image input signal. Thus, in each of the pixels of the selected line, the polar liquid 16 is moved toward the effective display region P1 or the non-effective display region P2, and the display color on the display surface is changed accordingly. At this time, as the polar liquid 16 is moved, the oil 17 is moved through the movement space K toward the non-effective display region P2 or the effective display region P1 that is opposite to the direction in which the polar liquid 16 is being moved.

On the other hand, the reference driver 8 and the scanning driver 9 apply the non-selected voltages (i.e., the reference voltage Vr and the scanning voltage Vs) to non-selected lines, namely to all the remaining reference electrodes 5 and scanning electrodes 6, respectively. Specifically, the reference driver 8 and the scanning driver 9 apply, e.g., intermediate voltages (Middle voltages, referred to as "M voltages" in the following) between the H voltage and the L voltage as the non-selected voltages to all the remaining reference electrodes 5 and scanning electrodes 6, respectively. Thus, in each of the pixels of the non-selected lines, the polar liquid 16 stands still without unnecessary displacement from the effective display region P1 or the non-effective display region P2, and the display color on the display surface is unchanged.

Table 1 shows the combinations of the voltages applied to the reference electrodes 5, the scanning electrodes 6, and the signal electrodes 4 in the above display operation. As shown in Table 1, the behavior of the polar liquid 16 and the display color on the display surface depend on the applied voltages. In Table 1, the H voltage, the L voltage, and the M voltage are abbreviated to "H", "L", and "M", respectively (the same is true for Table 2 in the following). The specific values of the H voltage, the L voltage, and the M voltage are, e.g., +16 V, 0 V, and +8 V, respectively.

TABLE 1

| | Reference electrode | Scanning electrode | Signal electrode | Behavior of polar liquid and display color on display surface |
|---|---|---|---|---|
| Selected line | H | L | H | The polar liquid is moved toward the scanning electrode. CF color display |
| | | | L | The polar liquid is moved toward the reference electrode. Black display |
| Non-selected line | M | M | H | The polar liquid is still (not moving). |
| | | | L | Black or CF color display |

<Selected Line Operation>

In the selected line, e.g., when the H voltage is applied to the signal electrodes 4, there is no potential difference between the reference electrode 5 and the signal electrodes 4 because the H voltage is applied to both of these electrodes. On the other hand, a potential difference between the signal electrodes 4 and the scanning electrode 6 occurs because the L voltage is applied to the scanning electrode 6. Therefore, the polar liquid 16 is moved in the display space S toward the scanning electrode 6 that makes a potential difference from the signal electrodes 4. Consequently, the polar liquid 16 has been moved to the non-effective display region P2 side, as shown in FIG. 5B, and allows the illumination light emitted from the backlight 18 to reach the color filter 11r by shifting the oil 17 toward the reference electrode 5. Thus, the display color on the display surface becomes red display (i.e., the CF color display) due to the color filter 11r. In the image display apparatus 1, when the CF color display is performed in all the three adjacent R, G, and B pixels as a result of the movement of the polar liquid 16 toward the non-effective display region P2, the red, green, and blue colors of light from the corresponding R, G, and B pixels are mixed into white light, resulting in the white display.

In the selected line, when the L voltage is applied to the signal electrodes 4, a potential difference occurs between the reference electrode 5 and the signal electrodes 4, but not between the signal electrodes 4 and the scanning electrode 6. Therefore, the polar liquid 16 is moved in the display space S toward the reference electrode 5 that makes a potential difference from the signal electrodes 4. Consequently, the polar liquid 16 has been moved to the effective display region P1 side, as shown in FIG. 5A, and prevents the illumination light emitted from the backlight 18 from reaching the color filter 11r. Thus, the display color on the display surface becomes black display (i.e., the non-CF color display) due to the presence of the polar liquid 16.

<Non-Selected Line Operation>

In the non-selected lines, e.g., when the H voltage is applied to the signal electrodes 4, the polar liquid 16 stands still in the same position, and the current display color is maintained. Since the M voltages are applied to both the reference electrodes 5 and the scanning electrodes 6, the potential difference between the reference electrodes 5 and the signal electrodes 4 is the same as that between the scanning electrodes 6 and the signal electrodes 4. Consequently, the display color is maintained without changing from the black display or the CF color display in the current state.

Similarly, in the non-selected lines, even when the L voltage is applied to the signal electrodes 4, the polar liquid 16 stands still in the same position, and the current display color is maintained. Since the M voltages are applied to both the reference electrodes 5 and the scanning electrodes 6, the potential difference between the reference electrodes 5 and the signal electrodes 4 is the same as that between the scanning electrodes 6 and the signal electrodes 4.

As described above, in the non-selected lines, the polar liquid 16 is not moved, but stands still and the display color on the display surface is unchanged regardless of whether the H or L voltage is applied to the signal electrodes 4.

On the other hand, in the selected line, the polar liquid 16 can be moved in accordance with the voltage applied to the signal electrodes 4, as described above, and the display color on the display surface can be changed accordingly.

In the image display apparatus 1, depending on the combinations of the applied voltages in Table 1, the display color of each pixel on the selected line can be, e.g., the CF colors (red, green, or blue) produced by the color filters 11r, 11g, and 11b or the non-CF color (black) due to the polar liquid 16 in accordance with the voltage applied to the signal electrodes 4 corresponding to the individual pixels, as shown in FIG. 6. When the reference driver 8 and the scanning driver 9 determine a selected line of the reference electrode 5 and the scanning electrode 6 by performing their scanning operations, e.g., from the left to the right of FIG. 6, the display colors of the pixels in the display portion of the image display apparatus 1 also are changed in sequence from the left to the right of FIG. 6. Therefore, if the reference driver 8 and the scanning driver 9 perform the scanning operations at a high speed, the display colors of the pixels in the display portion of the image display apparatus 1 also can be changed at a high speed. Moreover, by applying the signal voltage Vd to the signal electrodes 4 in synchronization with the scanning operation for the selected line, the image display apparatus 1 can display various information including dynamic images based on the external image input signal.

The combinations of the voltages applied to the reference electrodes 5, the scanning electrodes 6, and the signal electrodes 4 are not limited to Table 1, and may be as shown in Table 2.

TABLE 2

| | Reference electrode | Scanning electrode | Signal electrode | Behavior of polar liquid and display color on display surface |
| --- | --- | --- | --- | --- |
| Selected line | L | H | L | The polar liquid is moved toward the scanning electrode. CF color display |
| | | | H | The polar liquid is moved toward the reference electrode. Black display |
| Non-selected line | M | M | H L | The polar liquid is still (not moving). Black or CF color display |

The reference driver 8 and the scanning driver 9 perform their scanning operations to determine a selected line by applying the L voltage (second voltage) and the H voltage (first voltage) as the selected voltages to the reference electrodes 5 and the scanning electrodes 6 in sequence in a predetermined scanning direction, e.g., from the left to the right of FIG. 6, respectively. In this selected line, the signal driver 7 applies the H or L voltage (i.e., the signal voltage Vd) to the corresponding signal electrodes 4 in accordance with the external image input signal.

On the other hand, the reference driver 8 and the scanning driver 9 apply the M voltages as the non-selected voltages to the non-selected lines, namely to all the remaining reference electrodes 5 and scanning electrodes 6.

<Selected Line Operation>

In the selected line, e.g., when the L voltage is applied to the signal electrodes 4, there is no potential difference between the reference electrode 5 and the signal electrodes 4 because the L voltage is applied to both of these electrodes. On the other hand, a potential difference between the signal electrodes 4 and the scanning electrode 6 occurs because the H voltage is applied to the scanning electrode 6. Therefore, the polar liquid 16 is moved in the display space S toward the scanning electrode 6 that makes a potential difference from the signal electrodes 4. Consequently, the polar liquid 16 has been moved to the non-effective display region P2 side, as shown in FIG. 5B, and allows the illumination light emitted from the backlight 18 to reach the color filter 11r by shifting the oil 17 toward the reference electrode 5. Thus, the display color on the display surface becomes red display (i.e., the CF color display) due to the color filter 11r. Like Table 1, when the CF color display is performed in all the three adjacent R, G, and B pixels, the white display is performed.

In the selected line, when the H voltage is applied to the signal electrodes 4, a potential difference occurs between the reference electrode 5 and the signal electrodes 4, but not between the signal electrodes 4 and the scanning electrode 6. Therefore, the polar liquid 16 is moved in the display space S toward the reference electrode 5 that makes a potential difference from the signal electrodes 4. Consequently, the polar liquid 16 has been moved to the effective display region P1 side, as shown in FIG. 5A, and prevents the illumination light emitted from the backlight 18 from reaching the color filter 11r. Thus, the display color on the display surface becomes black display (i.e., the non-CF color display) due to the presence of the polar liquid 16.

<Non-Selected Line Operation>

In the non-selected lines, e.g., when the L voltage is applied to the signal electrodes 4, the polar liquid 16 stands still in the same position, and the current display color is maintained. Since the M voltages are applied to both the reference electrodes 5 and the scanning electrodes 6, the potential difference between the reference electrodes 5 and the signal electrodes 4 is the same as that between the scanning electrodes 6 and the signal electrodes 4. Consequently, the display color is maintained without changing from the black display or the CF color display in the current state.

Similarly, in the non-selected lines, even when the H voltage is applied to the signal electrodes 4, the polar liquid 16 stands still in the same position, and the current display color is maintained. Since the M voltages are applied to both the reference electrodes 5 and the scanning electrodes 6, the potential difference between the reference electrodes 5 and the signal electrodes 4 is the same as that between the scanning electrodes 6 and the signal electrodes 4.

In the non-selected lines, as shown in Table 2, similarly to Table 1, the polar liquid 16 is not moved, but stands still and the display color on the display surface is unchanged regardless of whether the H or L voltage is applied to the signal electrodes 4.

On the other hand, in the selected line, the polar liquid 16 can be moved in accordance with the voltage applied to the signal electrodes 4, as described above, and the display color on the display surface can be changed accordingly.

In the image display apparatus 1 of this embodiment, other than the combinations of the applied voltages shown in Tables 1 and 2, the voltage applied to the signal electrodes 4 not only has two values of the H voltage and the L voltage, but also may be changed between the H voltage and the L voltage in accordance with information to be displayed on the display surface. That is, the image display apparatus 1 can perform the gradation display by controlling the signal voltage Vd. Thus, the display element 10 can achieve excellent display performance.

In the display element 10 of this embodiment having the above configuration, the inside of the display space S is hermetically divided by the rib 14 in accordance with each of the pixel regions P. Therefore, unlike the conventional example, the display element 10 of this embodiment can prevent the flow of the oil (insulating fluid) 17 from the adjacent pixel regions P, and thus can prevent a slight movement of the polar liquid 16 due to the oil 17 from the adjacent pixel regions P. Moreover, in the display element 10 of this embodiment, the movement space K in which the oil 17 is moved is provided in the display space S for each of the pixel regions P. Therefore, when the polar liquid 16 is moved to change the display color, this polar liquid 16 can be moved smoothly and properly. Thus, the display element 10 of this embodiment can prevent a reduction in the display quality even if the gradation display is performed.

Moreover, in this embodiment, the movement space K is partitioned in the display space S by using a plurality of protruding members 19. The protruding members 19 are provided on the upper substrate (i.e., the other of the first substrate and the second substrate) 2 so as to protrude into the display space S, and are spaced at predetermined intervals. Thus, in this embodiment, the movement space K can be appropriately provided in the display space S by the protruding members 19.

In the image display apparatus (electric apparatus) 1 of this embodiment, the display portion uses the display element 10 that can prevent a reduction in the display quality even if the gradation display is performed. Thus, a high-performance image display apparatus (electric apparatus) 1 including the display portion with excellent display quality can be easily provided.

In the display element 10 of this embodiment, the signal driver (signal voltage application portion) 7, the reference driver (reference voltage application portion) 8, and the scanning driver (scanning voltage application portion) 9 apply the signal voltage Vd, the reference voltage Vr, and the scanning voltage Vs to the signal electrodes 4, the reference electrodes 5, and the scanning electrodes 6, respectively. Thus, in this embodiment, a matrix-driven display element 10 with excellent display quality can be easily provided, and the display color of each of the pixel regions can be appropriately changed.

Second Embodiment

Figure 7A:
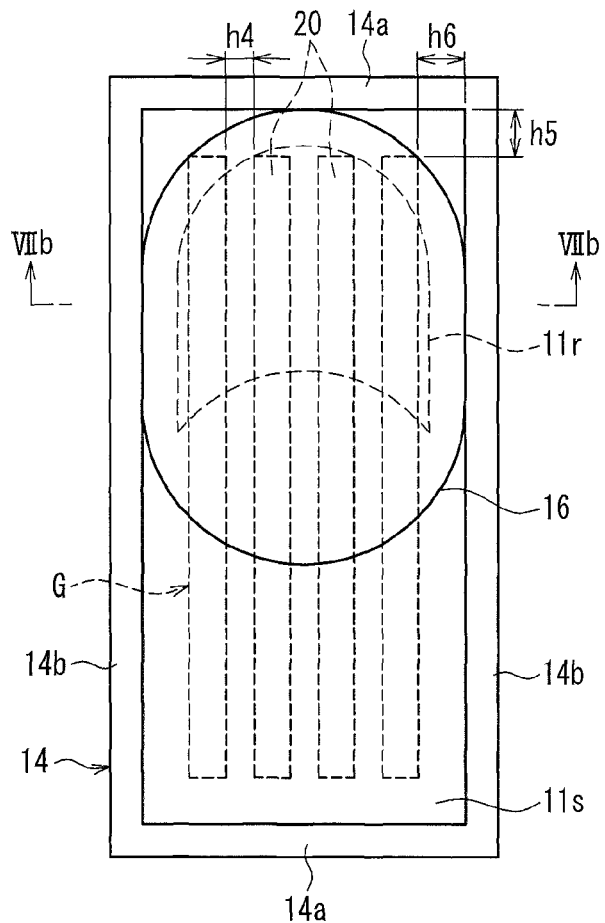
FIG. 7A is an enlarged plan view showing the main configuration in one pixel region of a display element of Embodiment 2 of the present invention.
Figure 7B:
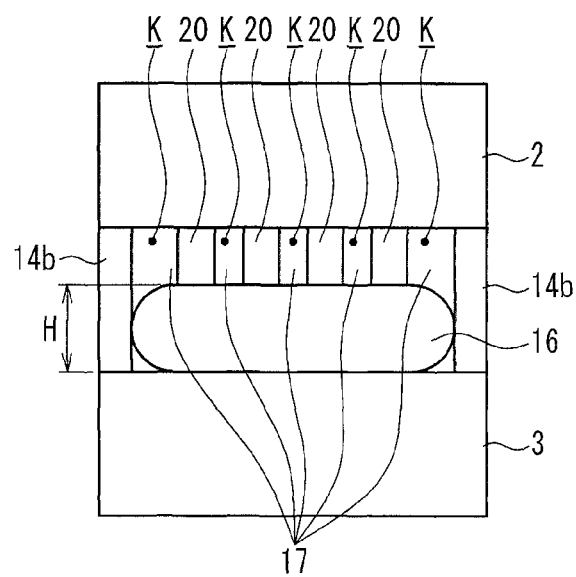
FIG. 7B is a cross-sectional view taken along the line VIIb-VIIb in FIG. 7A.
Figure 8A:
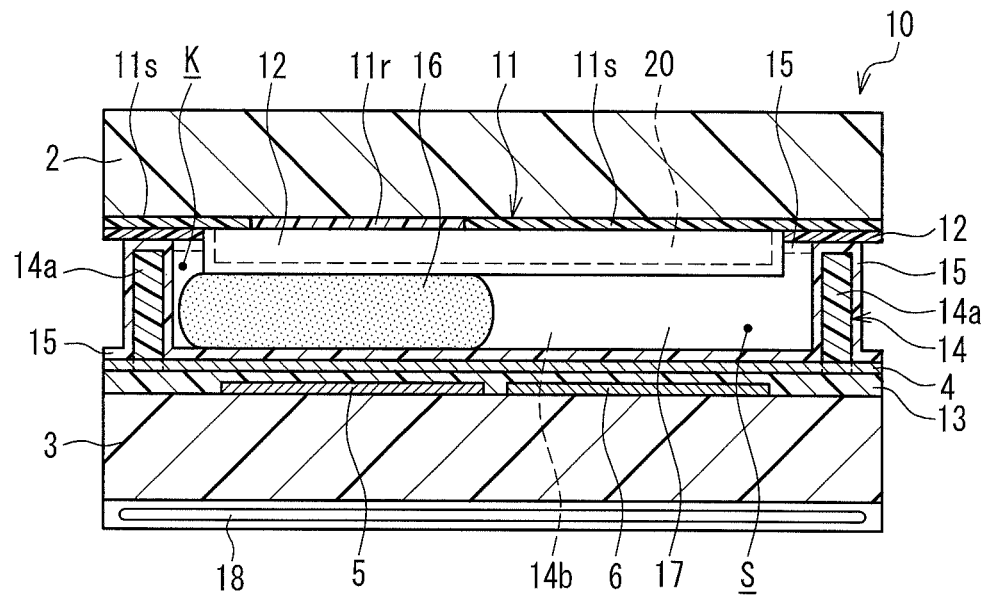
FIGS. 8A and 8B are cross-sectional views showing the main configuration of the display element in FIG. 7 during non-CF color display and CF color display, respectively.
Figure 8B:
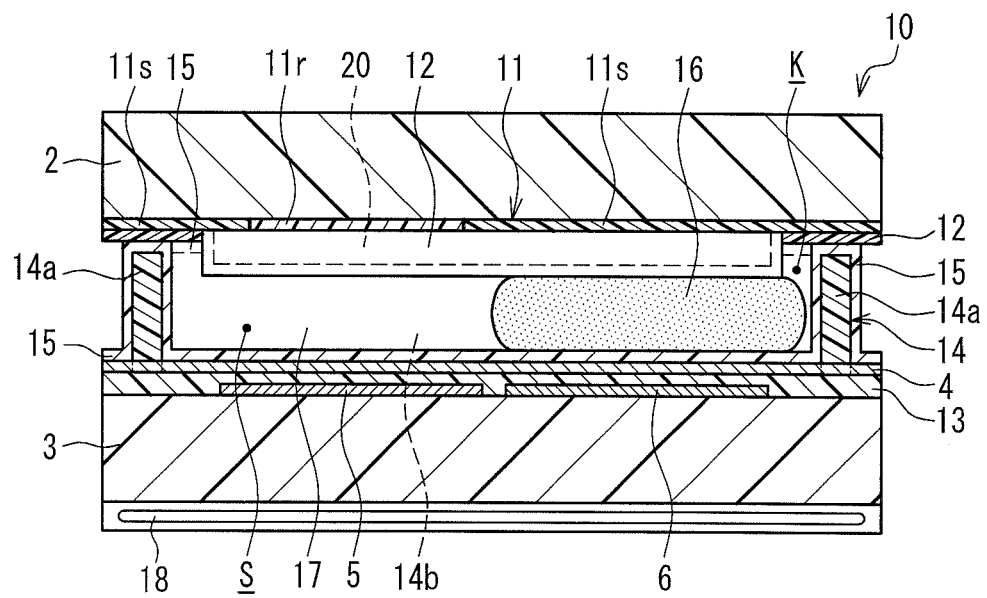

FIG. 7A is an enlarged plan view showing the main configuration in one pixel region of a display element of Embodiment 2 of the present invention. FIG. 7B is a cross-sectional view taken along the line VIIb-VIIb in FIG. 7A. FIGS. 8A and 8B are cross-sectional views showing the main configuration of the display element in FIG. 7 during non-CF color display and CF color display, respectively. In FIGS. 7A to 8B, this embodiment mainly differs from Embodiment 1 in that a guide portion is provided in the movement space with one end located in the effective display region and the other end located in the non-effective display region, and guides the insulating fluid to the effective display region side or the non-effective display region side in accordance with the movement of the polar liquid. The same components as those of Embodiment 1 are denoted by the same reference numerals, and the explanation will not be repeated.

As shown in FIGS. 7A to 8B, in the display element 10 of this embodiment, a plurality of, e.g., 4 rail members 20 are formed on the surface of the upper substrate 2 that faces the non-display surface side and are spaced at predetermined intervals. The rail members 20 are made of, e.g., an epoxy resin resist material, and each of the rail members 20 is in the form of a long rectangular parallelepiped.

The rail members 20 are linearly provided on the upper substrate 2 so as to protrude from the upper substrate 2 into the display space S and also to connect the effective display region P1 and the non-effective display region P2, thereby partitioning the movement space K in the display space S. In the display element 10 of this embodiment, similarly to Embodiment 1, each of the pixel regions P has the movement space K in which the oil (insulating fluid) 17 is moved, and the movement space K is formed on the upper substrate 2 side in the display space S with respect to the space in which the polar liquid 16 is moved, e.g., as shown in FIG. 7B.

The rail members 20 are provided in the movement space K with one end located in the effective display region P1 and the other end located in the non-effective display region P2, and function as a guide portion G (FIG. 7A) for guiding the oil 17 to the effective display region P1 side or the non-effective display region P2 side in accordance with the movement of the polar liquid 16, e.g., as shown in FIGS. 8A and 8B. Moreover, the rail members 20 are not provided on the lower substrate 3, on which the signal electrodes 4, the reference electrodes 5, the scanning electrodes 6, and the dielectric layer 13 are formed. Therefore, the rail members 20 do not interfere with the movement of the polar liquid 16 due to the electrowetting phenomenon.

In the rail members 20, as shown in FIGS. 7A and 7B, a distance h4 between two adjacent rail members 20, a distance h5 between the rib 14a and the rail member 20 that is adjacent to that rib 14a, and a distance h6 between the rib 14b and the rail member 20 that is adjacent to that rib 14b are each set to be smaller than the size H of the polar liquid 16 in the direction perpendicular to the upper substrate 2 and the lower substrate 3. Specifically, in this embodiment, each of the distances h4 to h6 is set to, e.g., 10 μm and the size H is set to, e.g., 40 μm.

As described above, this embodiment uses the distances h4 to h6 that are smaller than the size H, and thus can prevent the motion (movement) of the polar liquid 16 from becoming unstable. According to the experiments conducted by the present inventors, the above configuration can prevent the polar liquid 16 from entering a gap between two adjacent rail members 20, a gap between the rib 14a and the rail member 20 that is adjacent to that rib 14a, and a gap between the rib 14b and the rail member 20 that is adjacent to that rib 14b. Consequently, this embodiment can prevent the motion of the polar liquid 16 from becoming unstable. The experiments conducted by the present inventors demonstrated that, e.g., when the distance h4 between two adjacent rail members 20 was not less than the size H of the polar liquid 16, the polar liquid 16 entered the gap between the two adjacent rail members 20, and the motion of the polar liquid 16 was not stable.

With the above configuration, this embodiment can have effects comparable to those of Embodiment 1. In this embodiment, the guide portion G is provided that guides the oil (insulating fluid) 17 to the effective display region P1 side or the non-effective display region P2 side in accordance with the movement of the polar liquid 16. Thus, the oil 17 is guided through the guide portion G to the effective display region P1 side or the non-effective display region P2 side in accordance with the movement of the polar liquid 16. Therefore, when the polar liquid 16 is moved to change the display color, this polar liquid 16 can be moved more smoothly and properly. Consequently, the display element 10 with excellent display quality can be easily provided.

Moreover, in this embodiment, the guide portion G includes a plurality of rail members 20. The rail members 20 are linearly provided on the upper substrate 2 so as to protrude into the display space S and also to connect the effective display region P1 and the non-effective display region P2, and are spaced at predetermined intervals. Thus, in this embodiment, the oil 17 can be appropriately guided through the rail members 20 to the effective display region P1 side or the non-effective display region P2 side in accordance with the movement of the polar liquid 16.

Embodiment 3

Figure 9A:
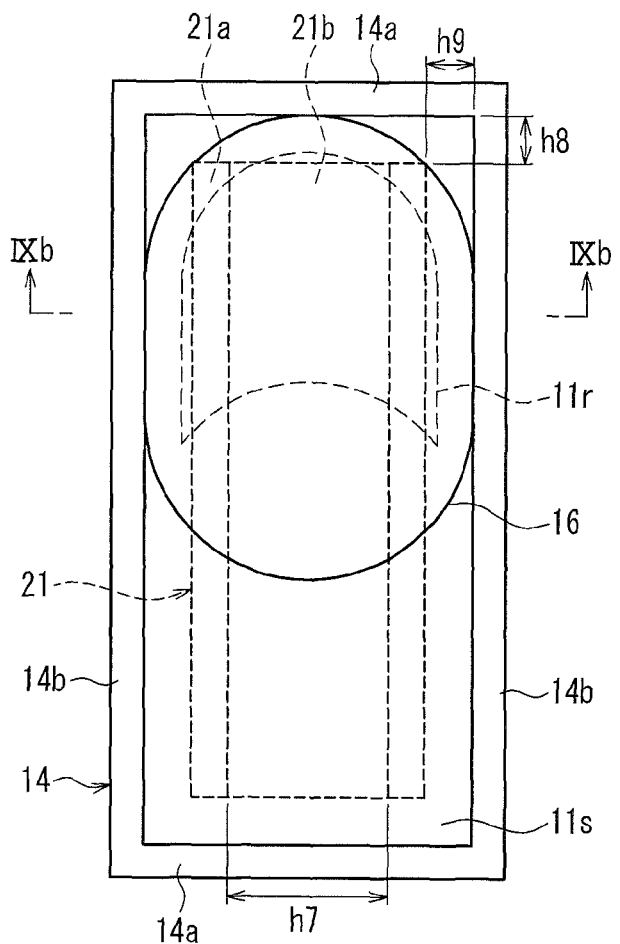
FIG. 9A is an enlarged plan view showing the main configuration in one pixel region of a display element of Embodiment 3 of the present invention.
Figure 9B:
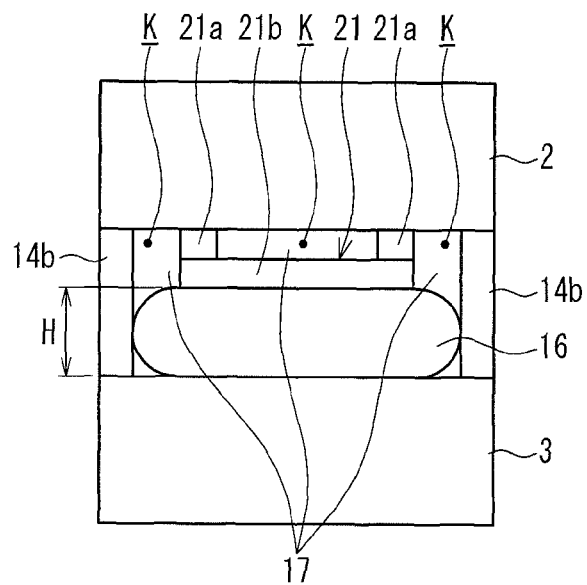
FIG. 9B is a cross-sectional view taken along the line IXb-IXb in FIG. 9A.
Figure 10A:
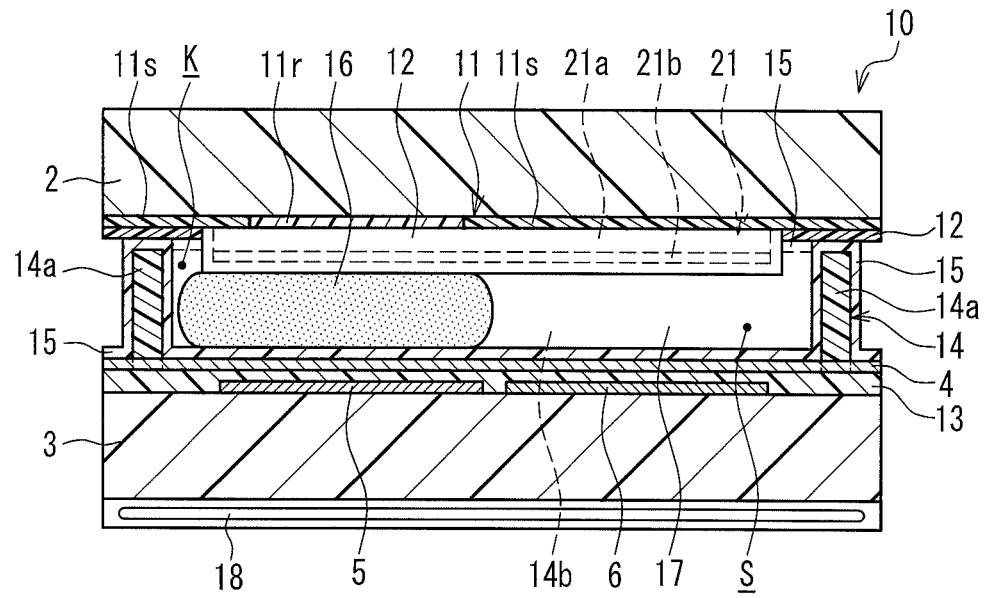
FIGS. 10A and 10B are cross-sectional views showing the main configuration of the display element in FIG. 9 during non-CF color display and CF color display, respectively.
Figure 10B:
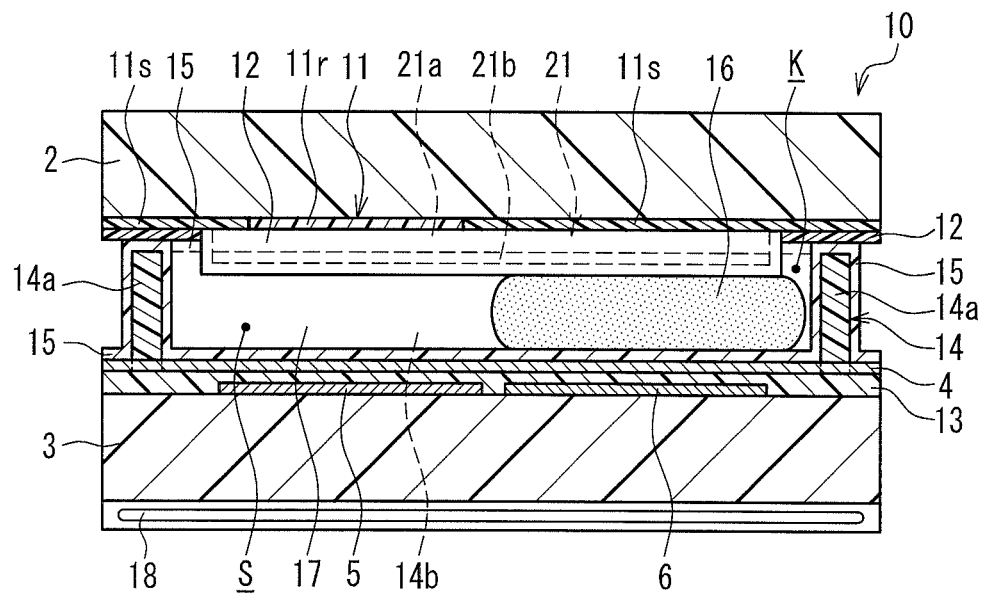

FIG. 9A is an enlarged plan view showing the main configuration in one pixel region of a display element of Embodiment 3 of the present invention. FIG. 9B is a cross-sectional view taken along the line IXb-IXb in FIG. 9A. FIGS. 10A and 10B are cross-sectional views showing the main configuration of the display element in FIG. 9 during non-CF color display and CF color display, respectively. In FIGS. 9A to 10B, this embodiment mainly differs from Embodiment 2 in that the guide portion includes a plate member that is connected to each of the edges of two rail members so as to face the other of the first substrate and the second substrate, and that has a planar shape so as to be in contact with the polar liquid in the display space. The same components as those of Embodiment 2 are denoted by the same reference numerals, and the explanation will not be repeated.

As shown in FIGS. 9A to 10B, in the display element 10 of this embodiment, a guide portion 21 is provided on the non-display surface side of the upper substrate 2. The guide portion 21 includes a plurality of, e.g., 2 rail members 21a and a plate member 21b. The two rail members 21a are formed on the surface of the upper substrate 2 that faces the non-display surface side and are spaced a predetermined distance apart. The plate member 21b is connected to each of the edges of the two rail members 21a so as to face the upper substrate 2, and has a planar shape so as to be in contact with the polar liquid 16 in the display space S.

Similarly to Embodiment 2, the guide portion 21 is provided in the movement space K with one end located in the effective display region P1 and the other end located in the non-effective display region P2, and guides the oil 17 to the effective display region P1 side or the non-effective display region P2 side in accordance with the movement of the polar liquid 16. In the display element 10 of this embodiment, similarly to Embodiment 2, each of the pixel regions P has the movement space K in which the oil (insulating fluid) 17 is moved, and the movement space K is formed on the upper substrate 2 side in the display space S with respect to the space in which the polar liquid 16 is moved, e.g., as shown in FIG. 9B.

The rail members 21a are linearly provided on the upper substrate 2 so as to protrude from the upper substrate 2 into the display space S and also to connect the effective display region P1 and the non-effective display region P2. The plate member 21b is connected to each of the edges of the two rail members 21a so that a tunnel-like movement space K is formed between the plate member 21b, the two rail members 21a, and the upper substrate 2. The rail members 21a and the plate member 21b are made of, e.g., an epoxy resin resist material. Moreover, the rail members 21a and the plate member 21b are not provided on the lower substrate 3, on which the signal electrodes 4, the reference electrodes 5, and the scanning electrodes 6, and the dielectric layer 13 are formed. Therefore, the rail members 21a and the plate member 21b do not interfere with the movement of the polar liquid 16 due to the electrowetting phenomenon.

In the two rail members 21a and the plate member 21b, as shown in FIGS. 9A and 9B, a distance h8 between the rib 14a and the rail member 21a and the plate member 21b that are adjacent to that rib 14a and a distance h9 between the rib 14b and the rail member 21a and the plate member 21b that are adjacent to that rib 14b are each set to be smaller than the size H of the polar liquid 16 in the direction perpendicular to the upper substrate 2 and the lower substrate 3. Specifically, in this embodiment, each of the distances h8 and h9 is set to, e.g., 10 μm and the size H is set to, e.g., 40 μm. Although a distance h7 between the two adjacent rail members 21a is set to, e.g., 50 μm, the polar liquid 16 does not enter a gap between the two rail members 21a because the gap is covered with the plate member 21b.

As described above, this embodiment uses the distances h8 and h9 that are smaller than the size H, and thus can prevent the motion (movement) of the polar liquid 16 from becoming unstable. According to the experiments conducted by the present inventors, the above configuration can prevent the polar liquid 16 from entering a gap between the rib 14a and the rail member 21a and the plate member 21b that are adjacent to that rib 14a and a gap between the rib 14b and the rail member 21a and the plate member 21b that are adjacent to that rib 14b. Consequently, this embodiment can prevent the motion of the polar liquid 16 from becoming unstable. The experiments conducted by the present inventors demonstrated that, e.g., when the distance h8 between the rib 14a and the rail member 21a and the plate member 21b that are adjacent to that rib 14a was not less than the size H of the polar liquid 16, the polar liquid 16 entered the gap between the rib 14a and the rail member 21a and the plate member 21b that are adjacent to that rib 14a, and the motion of the polar liquid 16 was not stable.

With the above configuration, this embodiment can have effects comparable to those of Embodiment 2. In this embodiment, the guide portion 21 includes the plate member 21b that is connected to each of the edges of the two rail members 21a so as to face the upper substrate 2, and has a planar shape so as to be in contact with the polar liquid 16 in the display space S. Thus, this embodiment ensures that a tunnel-like movement space K can be formed between the plate member 21b, the two rail members 21a, and the upper substrate 2. Moreover, since the plate member 21b has a planar shape so as to be in contact with the polar liquid 16 in the display space S, the polar liquid 16 can be moved more reliably and stably.

Embodiment 4

Figure 11:
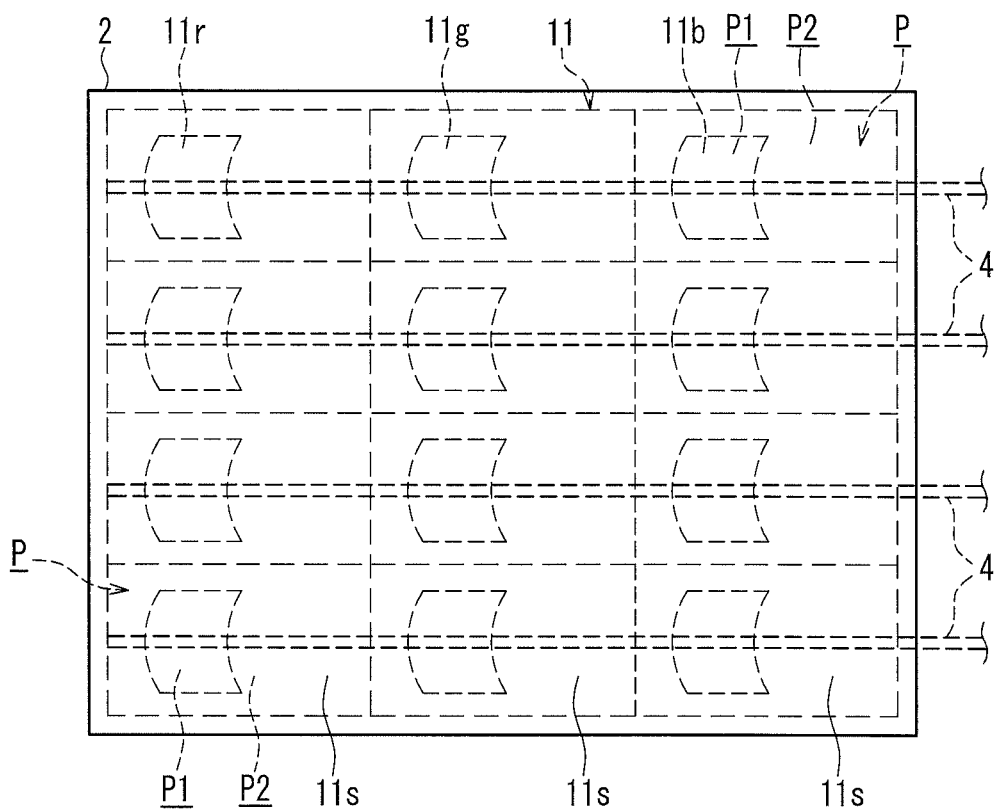
FIG. 11 is an enlarged plan view showing the main configuration of an upper substrate of a display element of Embodiment 4 of the present invention when viewed from a display surface side.
Figure 12:
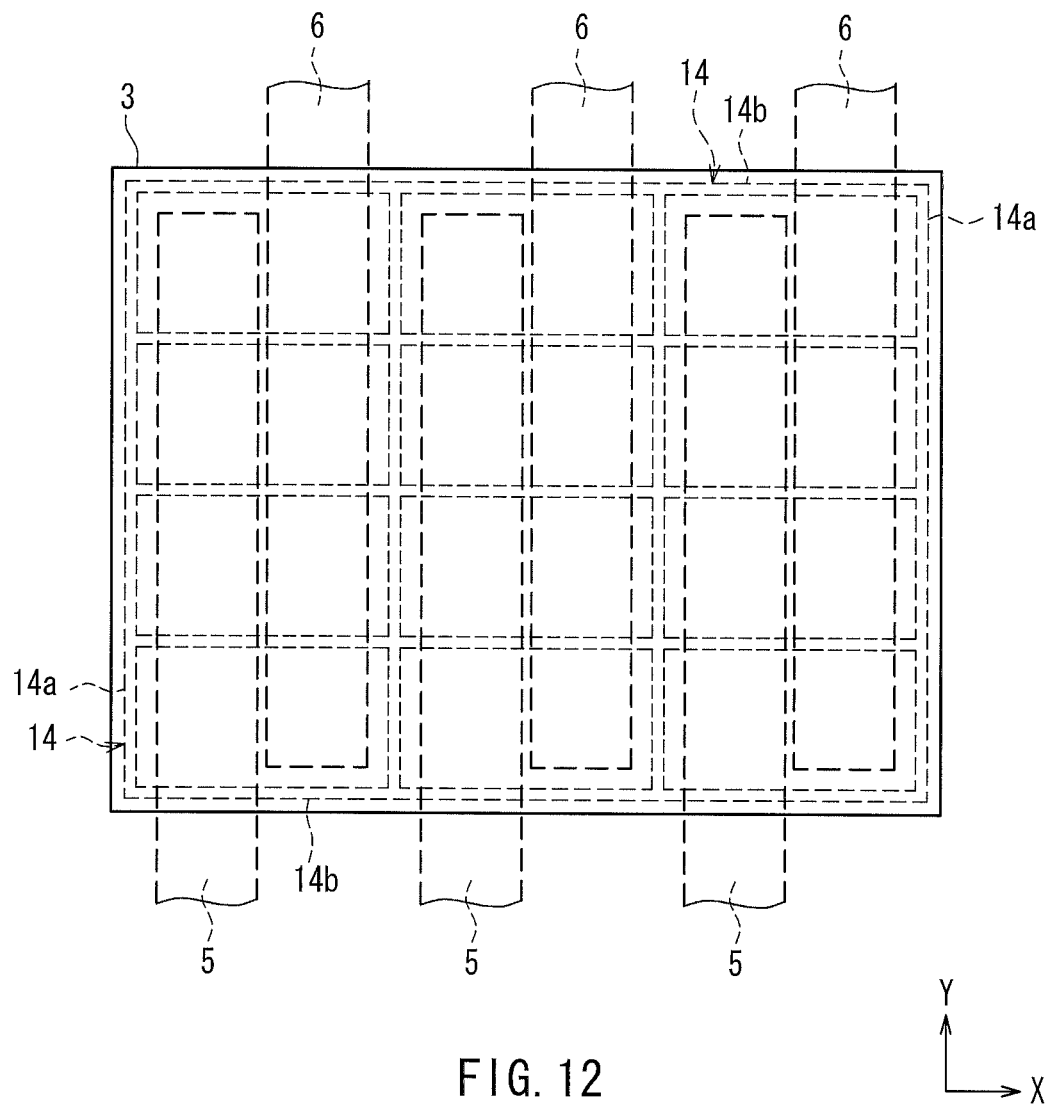
FIG. 12 is an enlarged plan view showing the main configuration of a lower substrate of a display element of Embodiment 4 of the present invention when viewed from a non-display surface side.
Figure 13A:
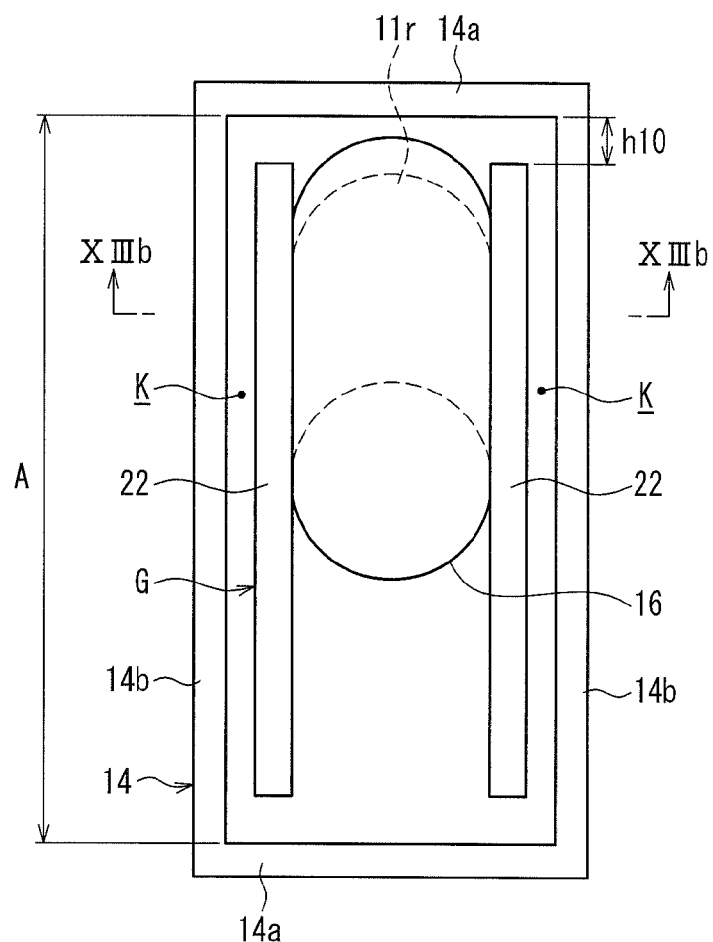
FIG. 13A is an enlarged plan view showing the main configuration in one pixel region of a display element of Embodiment 4 of the present invention.
Figure 13B:
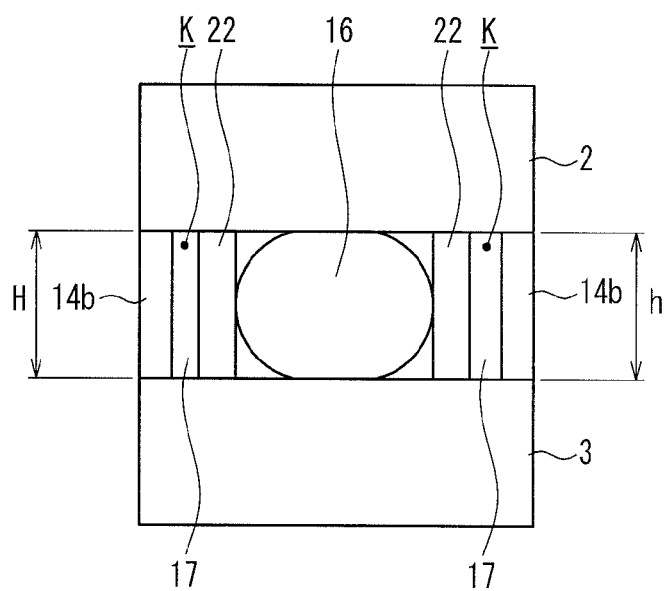
FIG. 13B is a cross-sectional view taken along the line XIIIb-XIIIb in FIG. 13A.
Figure 14A:
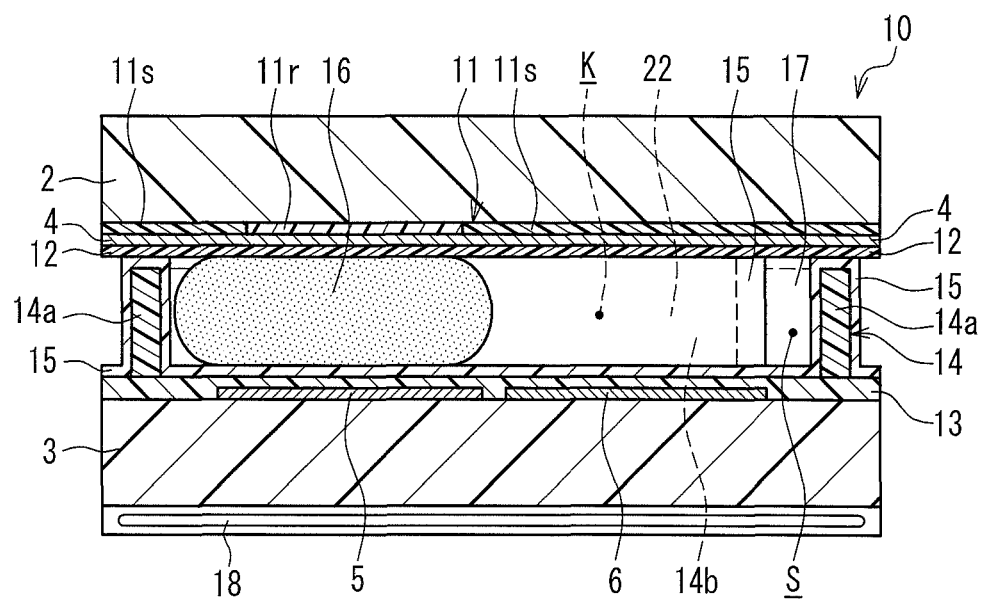
FIGS. 14A and 14B are cross-sectional views showing the main configuration of the display element in FIG. 13 during non-CF color display and CF color display, respectively.
Figure 14B:
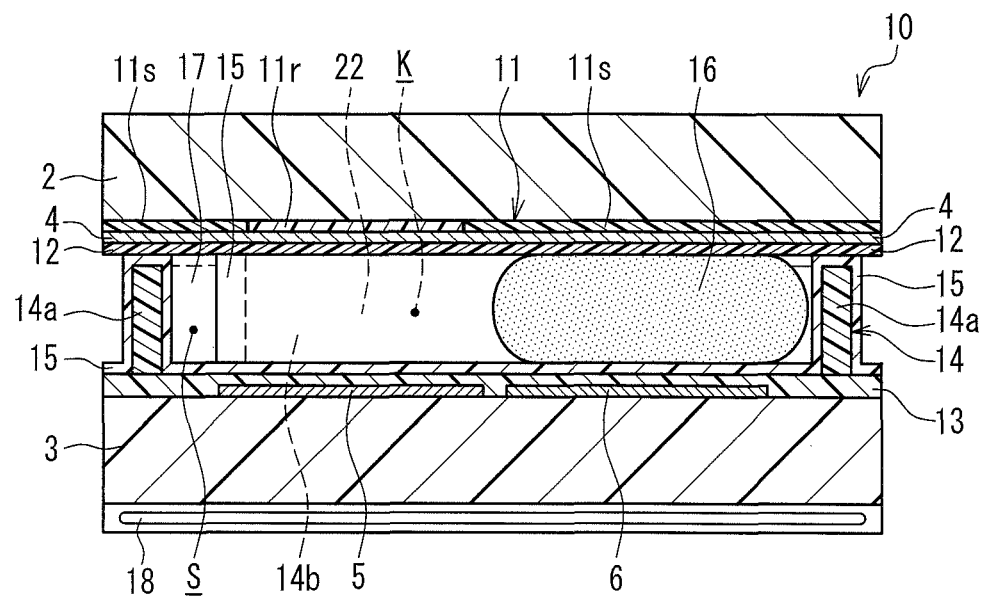

FIG. 11 is an enlarged plan view showing the main configuration of an upper substrate of a display element of Embodiment 4 of the present invention when viewed from a display surface side. FIG. 12 is an enlarged plan view showing the main configuration of a lower substrate of a display element of Embodiment 4 of the present invention when viewed from a non-display surface side. FIG. 13A is an enlarged plan view showing the main configuration in one pixel region of a display element of Embodiment 4 of the present invention. FIG. 13B is a cross-sectional view taken along the line XIIIb-XIIIb in FIG. 13A. FIGS. 14A and 14B are cross-sectional views showing the main configuration of the display element in FIG. 13 during non-CF color display and CF color display, respectively. For the sake of clarification, FIG. 11 omits the rail members (as will be described later) provided on the non-display surface side of the upper substrate.

In FIGS. 11 to 14B, this embodiment mainly differs from Embodiment 2 in that the guide portion includes two rail members that are linearly provided on at least one of the first substrate and the second substrate so as to connect the effective display region and the non-effective display region, and that are spaced a predetermined distance apart so as to sandwich the polar liquid. The same components as those of Embodiment 2 are denoted by the same reference numerals, and the explanation will not be repeated.

As shown in FIGS. 11 and 12, in the display element 10 of this embodiment, the signal electrodes 4 are provided on the non-display surface side of the upper substrate 2. Moreover, as shown in FIGS. 13A to 14B, a guide portion G is provided on the non-display surface side of the upper substrate 2. The guide portion G includes two rail members 22 that are formed on the surface of the upper substrate 2 that faces the non-display surface side and are spaced a predetermined distance apart so as to sandwich the polar liquid 16.

Similarly to Embodiment 2, the guide portion G is provided in the movement space K with one end located in the effective display region P1 and the other end located in the non-effective display region P2, and guides the oil 17 to the effective display region P1 side or the non-effective display region P2 side in accordance with the movement of the polar liquid 16. In the display element 10 of this embodiment, similarly to Embodiment 2, each of the pixel regions P has the movement space K in which the oil (insulating fluid) 17 is moved, and the movement space K is formed on the rib 14b side (i.e., on the rib 14b side of each of the rail members 22) in the display space S with respect to the space in which the polar liquid 16 is moved, e.g., as shown in FIG. 13B.

The rail members 22 are linearly provided on the upper substrate 2 so as to protrude from the upper substrate 2 into the display space S and also to connect the effective display region P1 and the non-effective display region P2. The rail members 22 are made of, e.g., an epoxy resin resist material. Since the two rail members 22 are provided in parallel so as to sandwich the polar liquid 16, the rail members 22 do not interfere with the movement of the polar liquid 16 due to the electrowetting phenomenon.

In the two rail members 22, as shown in FIGS. 13A and 13B, a distance h10 between the rib 14a and the end of each of the rail members 22 in the direction of the movement of the polar liquid 16 is set so as to satisfy the following inequality (1) with respect to a size A of the pixel region P in the direction of the movement of the polar liquid 16. Thus, in this embodiment, both the polar liquid 16 and the oil 17 can be moved smoothly.

$$0.02 \times A \leq h10 \leq 0.17 \times A \tag{1}$$

The experiments conducted by the present inventors demonstrated that, e.g., when the distance h10 between the rib 14a and the end of each of the rail members 22 was smaller than 0.02×A, the oil 17 was not likely to flow into the movement space K between the rail member 22 and the rib 14b, so that a smooth movement of the polar liquid 16 and the oil 17 was impeded. Moreover, when the distance h10 was greater than 0.17×A, the polar liquid 16 entered a gap between the rib 14a and each of the rail members 22, and the motion of the polar liquid 16 was not stable.

Moreover, as shown in FIG. 13B, a size h of each of the two rail members 22 in the direction perpendicular to the upper substrate 2 and the lower substrate 3 is set so as to satisfy the following inequality (2) with respect to the size H of the polar liquid 16 in the direction perpendicular to the upper substrate 2 and the lower substrate 3.

$$0.65 \times H \leq h \leq H \tag{2}$$

Specifically, as shown in FIG. 13B, the size h of each of the two rail members 22 in the direction perpendicular to the upper substrate 2 and the lower substrate 3 is set to the same as the size H of the polar liquid 16 in the direction perpendicular to the upper substrate 2 and the lower substrate 3. With this configuration, the polar liquid 16 can be reliably sandwiched between the two rail members 22, and thus can be moved more properly. The experiments conducted by the present inventors demonstrated that when the size h was smaller than 0.65×H, the two rail members 22 could not sandwich the polar liquid 16, and the motion of the polar liquid 16 became unstable. Moreover, when the size h was greater than the size H, the size h of the rail member 22 was greater than the size of the rib 14b in the above perpendicular direction, so that it was difficult to hermetically divide the inside of the display space S in accordance with each of the pixel regions P.

With the above configuration, this embodiment can have effects comparable to those of Embodiment 2. In this embodiment, the guide portion G includes the two rail members 22 that are spaced a predetermined distance apart so as to sandwich the polar liquid 16. Thus, this embodiment ensures that the space outside the two rail members 22 can be used as the movement space K. Therefore, when the display color is changed, a smooth movement of the oil (insulating fluid) 17 and the polar liquid 16 can be reliably achieved.

In the above description, the two rail members 22 are provided on the upper substrate (i.e., the other of the first substrate and the second substrate) 2. However, the rail members 22 of this embodiment are not limited thereto, and may be provided on at least one of the first substrate and the second substrate. Specifically, the two rail members 22 may be provided on the lower substrate (i.e., one of the first substrate and the second substrate) 3. Moreover, one of the two rail members 22 may be provided on the upper substrate 2 and the other may be provided on the lower substrate 3.

In addition to the above description, similarly to Embodiments 1 to 3, the signal electrodes 4 may be provided on the lower substrate 3. In this embodiment, unlike Embodiments 1 to 3, the signal electrodes 4 are not restricted by the lower substrate 3, since the two rail members 22 are provided so as to sandwich the polar liquid 16. Thus, this embodiment can increase the degree of freedom in design of the placement of the signal electrodes 4.

It should be noted that the above embodiments are all illustrative and not restrictive. The technological scope of the present invention is defined by the appended claims, and all changes that come within the range of equivalency of the claims are intended to be embraced therein.

For example, in the above description, the present invention is applied to an image display apparatus including a display portion. However, the present invention is not limited thereto, as long as it is applied to an electric apparatus with a display portion that displays the information including characters and images. For example, the present invention is suitable for various electric apparatuses with display portions such as a personal digital assistant such as an electronic organizer, a display apparatus for a personal computer or television, and an electronic paper.

In the above description, the electrowetting type display element is used, in which the polar liquid is moved in accordance with the application of an electric field to the polar liquid. However, the display element of the present invention is not limited thereto, as long as it is an electric-field-induced display element that can change the display color on the display surface by moving the polar liquid in the display space with the use of an external electric field. For example, the present invention can be applied to other types of electric-field-induced display elements such as an electroosmotic type, an electrophoretic type, and a dielectrophoretic type.

As described in each of the above embodiments, the electrowetting type display element is preferred because the polar liquid can be moved at a high speed and a low drive voltage. In the electrowetting type display element, the display color is changed with the movement of the polar liquid. Therefore, unlike a liquid crystal display apparatus or the like using a birefringent material such as a liquid crystal layer, it is possible to easily provide a high brightness display element with excellent utilization efficiency of light from the backlight or ambient light used for information display. Moreover, since a switching device does not need to be provided for each pixel, a high-performance matrix-driven display element having a simple structure can be achieved at a low cost.

The above description refers to the transmission type display element including a backlight. However, the present invention is not limited thereto, and may be applied to a reflection type display element including a light reflection portion such as a diffuse reflection plate, a semi-transmission type display element including the light reflection portion along with a backlight, or the like.

In the above description, the polar liquid is a potassium chloride aqueous solution. However, the polar liquid of the present invention is not limited thereto. Specifically, the polar liquid can be, e.g., a material including an electrolyte such as a zinc chloride, potassium hydroxide, sodium hydroxide, alkali metal hydroxide, zinc oxide, sodium chloride, lithium salt, phosphoric acid, alkali metal carbonate, or ceramics with oxygen ion conductivity. The solvent can be, e.g., an organic solvent such as alcohol, acetone, formamide, or ethylene glycol other than water. The polar liquid of the present invention also can be an ionic liquid (room temperature molten salt) including pyridine-, alicyclic amine-, or aliphatic amine-based cations and fluorine anions such as fluoride ions or triflate.

The polar liquid of the present invention includes a conductive liquid having conductivity and a high dielectric liquid with a relative dielectric constant of a predetermined value or more, and preferably 15 or more.

As described in each of the above embodiments, the aqueous solution in which a predetermined electrolyte is dissolved is preferred for the polar liquid because the display element can have excellent handling properties and also be easily produced.

In the above description, the nonpolar oil is used. However, the present invention is not limited thereto, as long as an insulating fluid that is not mixed with the polar liquid is used. For example, air may be used instead of the oil. Moreover, silicone oil or an aliphatic hydrocarbon also can be used as the oil. The insulating fluid of the present invention includes a fluid with a relative dielectric constant of a predetermined value or less, and preferably 5 or less.

As described in each of the above embodiments, the nonpolar oil that is not compatible with the polar liquid is preferred because the droplets of the polar liquid move more easily in the nonpolar oil compared to the use of air and the polar liquid. Consequently, the polar liquid can be moved at a high speed, and the display color can be switched at a high speed.

In the above description, the signal electrodes, the reference electrodes, and the scanning electrodes are provided on the lower substrate (second substrate). However, the present invention is not limited thereto, and may have a configuration in which the signal electrodes are placed in the display space so as to come into contact with the polar liquid, and the reference electrodes and the scanning electrodes are provided on one of the first substrate and the second substrate so as to be electrically insulated from the polar liquid and each other. Specifically, e.g., the signal electrodes may be provided in the intermediate portion between the first substrate and the second substrate, and the reference electrodes and the scanning electrodes may be provided on the first substrate.

In the above description, the reference electrodes and the scanning electrodes are located on the effective display region side and the non-effective display region side, respectively. However, the present invention is not limited thereto, and the reference electrodes and the scanning electrodes may be located on the non-effective display region side and the effective display region side, respectively.

In the above description, the reference electrodes and the scanning electrodes are formed on the surface of the lower substrate (second substrate) that faces the display surface side. However, the present invention is not limited thereto, and can use the reference electrodes and the scanning electrodes that are buried in the second substrate made of an insulating material. In this case, the second substrate also can serve as a dielectric layer, which can eliminate the formation of the dielectric layer. Moreover, the signal electrodes may be directly provided on the first and second substrates serving as dielectric layers, and thus may be placed in the display space.

In the above description, the reference electrodes and the scanning electrodes are made of transparent electrode materials. However, the present invention is not limited thereto, as long as either one of the reference electrodes and the scanning electrodes, which are arranged to face the effective display regions of the pixels, are made of the transparent electrode materials. The other electrodes that do not face the effective display regions can be made of opaque electrode materials such as aluminum, silver, chromium, and other metals.

In the above description, the reference electrodes and the scanning electrodes are in the form of stripes. However, the shapes of the reference electrodes and the scanning electrodes of the present invention are not limited thereto. For example, the reflection type display element may use linear or mesh electrodes that are not likely to cause a light loss, since the utilization efficiency of light used for information display is lower in the reflection type display element than in the transmission type display element.

In the above description, the signal electrodes are linear wiring. However, the signal electrodes of the present invention are not limited thereto, and can be wiring with other shapes such as mesh wiring.

In the above description, the black colored polar liquid and the color filter layer are used to form the pixels of R, G, and B colors on the display surface side. However, the present invention is not limited thereto, as long as a plurality of pixel regions are provided in accordance with a plurality of colors that enable full-color display to be shown on the display surface. Specifically, the polar liquids that are colored different colors such as RGB, CMY composed of cyan (C), magenta (M), and yellow (Y), or RGBYC also can be used.

In the above description, the color filter layer is formed on the surface of the upper substrate (first substrate) that faces the non-display surface side. However, the present invention is not limited thereto, and the color filter layer may be formed on the surface of the first substrate that faces the display surface side or on the lower substrate (second substrate). Thus, the color filter layer is preferred compared to the use of the polar liquids with different colors because the display element can be easily produced. Moreover, the color filter layer is also preferred because the effective display region and the non-effective display region can be properly and reliably defined with respect to the display space by the color filter (aperture) and the black matrix (light-shielding layer) included in the color filter layer, respectively.

In the description of Embodiments 2 and 3, the guide portion includes a plurality of rail members that are linearly provided on the other of the first substrate and the second substrate so as to protrude into the display space and also to connect the effective display region and the non-effective display region, and that are spaced at predetermined intervals. However, the guide portion of the present invention is not limited thereto, as long as it is provided in the movement space with one end located in the effective display region and the other end located in the non-effective display region, and guides the insulating fluid to the effective display region side or the non-effective display region side in accordance with the movement of the polar liquid. Specifically, the guide portion may include a plurality of non-linear rail members that are spaced at predetermined intervals.

In the description of Embodiments 2 and 3, the rail members 20 of the guide portion G and the rail members 21*a* of the guide portion 21 are provided inside the rib 14, as shown in FIGS. 7A and 9A, respectively. However, the guide portion of the present invention is not limited thereto, as long as one end of the guide portion is located in the effective display region and the other end of the guide portion is located in the non-effective display region.

Figure 15A:
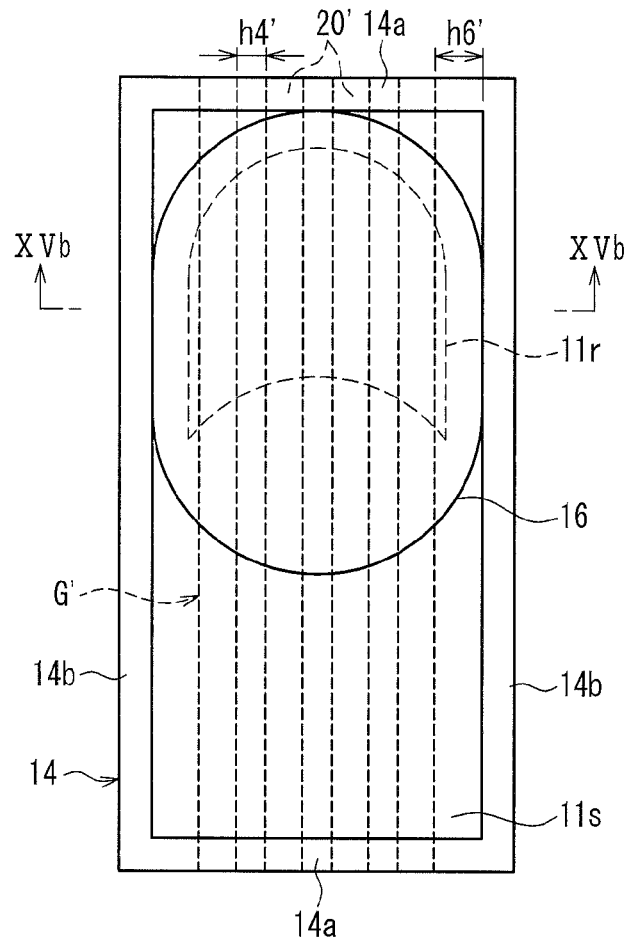
FIG. 15A is an enlarged plan view showing the main configuration in one pixel region of a modified example of a display element of Embodiment 2 of the present invention.
Figure 15B:
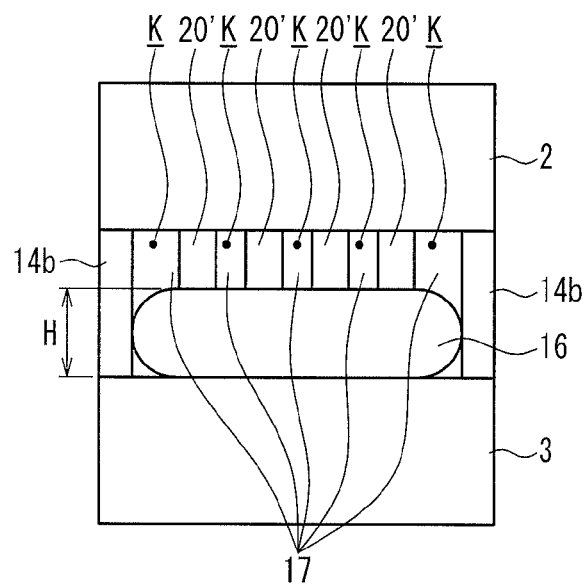
FIG. 15B is a cross-sectional view taken along the line XVb-XVb in FIG. 15A.

Specifically, as shown in FIG. 15, a guide portion G' may include four rail members 20' that are interposed between the upper substrate 2 and the ribs 14*a*. In the guide portion G', similarly to Embodiment 2, a distance h4' between two adjacent rail members 20' and a distance h6' between the rib 14*b* and the rail member 20' that is adjacent to that rib 14*b* are each set to be smaller than the size H of the polar liquid 16 in the direction perpendicular to the upper substrate 2 and the lower substrate 3. When the above rail members 20' are used, a plurality of pixel regions P can share each of the rail members 20'. In such a case, unlike Embodiment 2, four rail members 20 do not need to be provided for each of the pixel regions P, and four rail members 20' may be formed in each row of pixel regions P arranged in the X direction of FIG. 2.

Figure 16A:
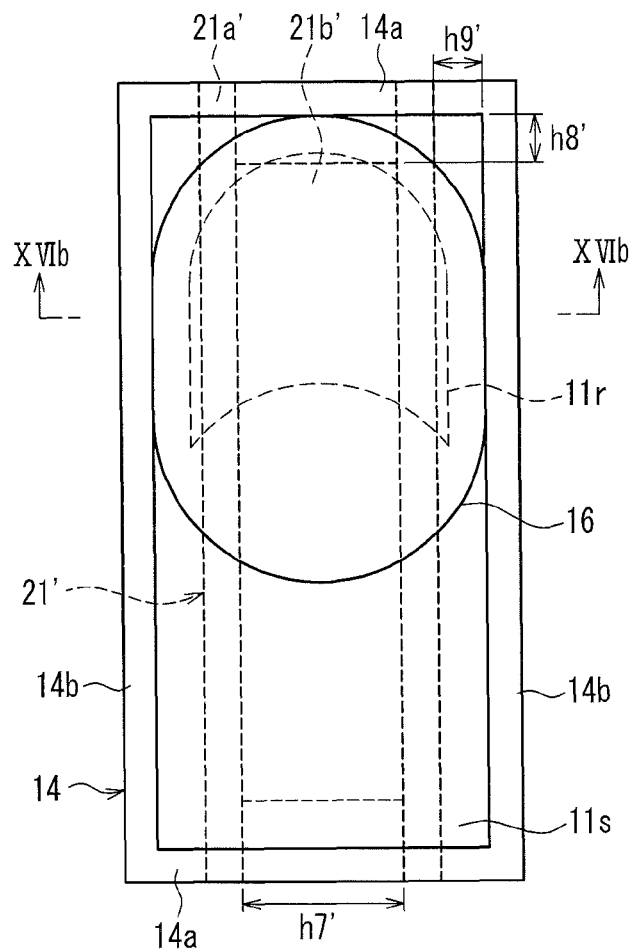
FIG. 16A is an enlarged plan view showing the main configuration in one pixel region of a modified example of a display element of Embodiment 3 of the present invention.
Figure 16B:
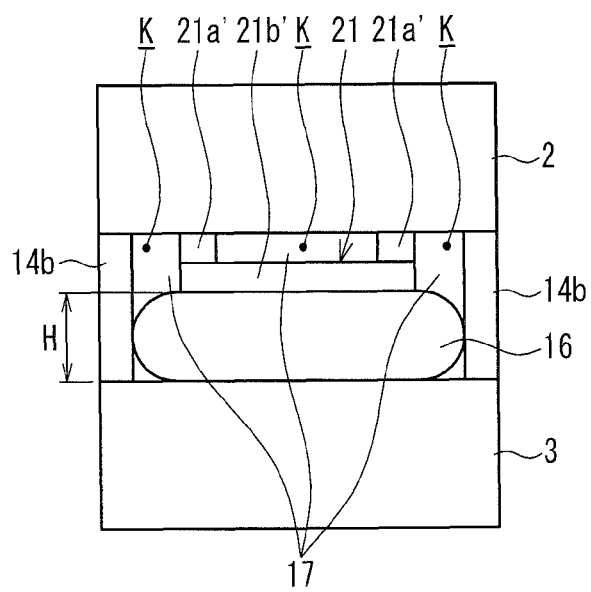
FIG. 16B is a cross-sectional view taken along the line XVIb-XVIb in FIG. 16A.

As shown in FIG. 16, a guide portion 21' may include two rail members 21*a*' that are interposed between the upper substrate 2 and the ribs 14*a*. In the guide portion 21', a plate member 21*b*' is connected to each of the edges of the two rail members 21*a*' so that a tunnel-like movement space K is formed between the plate member 21*b*', the two rail members 21*a*', and the upper substrate 2. Moreover, in the guide portion 21', similarly to Embodiment 3, a distance h8' between the rib 14*a* and the plate member 21*b*' that is adjacent to that rib 14*a* and a distance h9' between the rib 14*b* and the rail member 21*a*' and the plate member 21*b*' that are adjacent to that rib 14*b* are each set to be smaller than the size H of the polar liquid 16 in the direction perpendicular to the upper substrate 2 and the lower substrate 3. Similarly to Embodiment 3, although a distance h7' between the two adjacent rail members 21*a*' is set to, e.g., 50 μm, the polar liquid 16 does not enter a gap between the two rail members 21*a*' because the gap is covered with the plate member 21*b*'. When the above rail members 21*a*' are used, a plurality of pixel regions P can share each of the rail members 21*a*'. In such a case, unlike Embodiment 3, two rail members 21*a* do not need to be provided for each of the pixel regions P, and two rail members 21*a*' may be formed in each row of pixel regions P arranged in the X direction of FIG. 2.

INDUSTRIAL APPLICABILITY

The present invention is useful for a display element that can prevent a reduction in the display quality even if the gradation display is performed, and an electric apparatus using the display element.

DESCRIPTION OF REFERENCE NUMERALS

1 Image display apparatus (electric apparatus)
2 Upper substrate (first substrate)
3 Lower substrate (second substrate)
4 Signal electrode
5 Reference electrode
6 Scanning electrode
7 Signal driver (signal voltage application portion)
8 Reference driver (reference voltage application portion)
9 Scanning driver (scanning voltage application portion)
10 Display element
11 Color filter layer
11*r*, 11*g*, 11*b* Color filter (aperture)
11*s* Black matrix (light-shielding layer)

13 Dielectric layer
14, 14a, 14b Rib
16 Polar liquid
17 Oil (insulating fluid)
19 Protruding member
20 Rail member
21 Guide portion
21a Rail member
21b Plate member
22 Rail member
S Display space
P Pixel region
P1 Effective display region
P2 Non-effective display region
K Movement space
G Guide portion

The invention claimed is:

1. A display element that comprises a first substrate provided on a display surface side, a second substrate provided on a non-display surface side of the first substrate so that a predetermined display space is formed between the first substrate and the second substrate, an effective display region and a non-effective display region that are defined with respect to the display space, and a polar liquid sealed in the display space so as to be moved toward the effective display region or the non-effective display region, and that is capable of changing a display color on the display surface side by moving the polar liquid, wherein the display element comprises:
a plurality of signal electrodes that are placed in the display space so as to come into contact with the polar liquid, and are also provided along a predetermined arrangement direction;
a plurality of reference electrodes that are provided on one of the first substrate and the second substrate so as to be electrically insulated from the polar liquid and to be located on one of the effective display region side and the non-effective display region side, and are also arranged so as to intersect with the plurality of the signal electrodes;
a plurality of scanning electrodes that are provided on one of the first substrate and the second substrate so as to be electrically insulated from the polar liquid and the plurality of the reference electrodes and to be located on the other of the effective display region side and the non-effective display region side, and are also arranged so as to intersect with the plurality of the signal electrodes;
a plurality of pixel regions that are located at each of the intersections of the plurality of the signal electrodes and the plurality of the scanning electrodes;
a rib that is provided on at least one of the first substrate and the second substrate so as to hermetically divide an inside of the display space in accordance with each of the plurality of the pixel regions; and
an insulating fluid that is not mixed with the polar liquid and is movably sealed in the display space for each of the plurality of the pixel regions,
wherein a movement space in which the insulating fluid is moved is provided in the display space for each of the plurality of the pixel regions,
wherein the movement space is partitioned in the display space by using a plurality of protruding members that are provided on the other of the first substrate and the second substrate so as to protrude into the display space, and that are spaced at predetermined intervals; and
wherein in the plurality of the protruding members, a distance between two adjacent protruding members and a distance between the rib and the protruding member that is adjacent to said rib are each set to be smaller than a size of the polar liquid in a direction perpendicular to the first substrate and the second substrate.

2. A display element that comprises a first substrate provided on a display surface side, a second substrate provided on a non-display surface side of the first substrate so that a predetermined display space is formed between the first substrate and the second substrate, an effective display region and a non-effective display region that are defined with respect to the display space, and a polar liquid sealed in the display space so as to be moved toward the effective display region or the non-effective display region, and that is capable of changing a display color on the display surface side by moving the polar liquid, wherein the display element comprises:
a plurality of signal electrodes that are placed in the display space so as to come into contact with the polar liquid, and are also provided along a predetermined arrangement direction;
a plurality of reference electrodes that are provided on one of the first substrate and the second substrate so as to be electrically insulated from the polar liquid and to be located on one of the effective display region side and the non-effective display region side, and are also arrayed so as to intersect with the plurality of the signal electrodes;
a plurality of scanning electrodes that are provided on one of the first substrate and the second substrate so as to be electrically insulated from the polar liquid and the plurality of the reference electrodes and to be located on the other of the effective display region side and the non-effective display region side, and are also arranged so as to intersect with the plurality of the signal electrodes;
a plurality of pixel regions that are located at each of the intersections of the plurality of the signal electrodes and the plurality of the scanning electrodes;
a rib that is provided on at least one of the first substrate and the second substrate so as to hermetically divide an inside of the display space in accordance with each of the plurality of the pixel regions; and
an insulating fluid that is not mixed with the polar liquid and is movably sealed in the display space for each of the plurality of the pixel regions,
wherein a movement space in which the insulating fluid is moved is provided in the display space for each of the plurality of the pixel regions,
wherein a guide portion is provided in the movement space with one end located in the effective display region and the other end located in the non-effective display region, and guides the insulating fluid to the effective display region side or the non-effective display region side in accordance with a movement of the polar liquid.

3. The display element according to claim 2, wherein the guide portion includes a plurality of rail members that are linearly provided on the other of the first substrate and the second substrate so as to protrude into the display space and also to connect the effective display region and the non-effective display region, and that are spaced at predetermined intervals.

4. The display element according to claim 3, wherein in the plurality of the rail members, a distance between two adjacent rail members and a distance between the rib and the rail member that is adjacent to said rib are each set to be smaller than a size of the polar liquid in a direction perpendicular to the first substrate and the second substrate.

5. The display element according to claim 3, wherein the guide portion includes a plate member that is connected to each of edges of the plurality of the rail members so as to face the other of the first substrate and the second substrate, and that has a planar shape so as to be in contact with the polar liquid in the display space.

6. The display element according to claim 5, wherein a distance between the rib and the plate member is set to be smaller than the size of the polar liquid in the direction perpendicular to the first substrate and the second substrate.

7. The display element according to claim 2, wherein the guide portion includes two rail members that are linearly provided on at least one of the first substrate and the second substrate so as to protrude into the display space and also to connect the effective display region and the non-effective display region, and that are spaced a predetermined distance apart so as to sandwich the polar liquid.

8. The display element according to claim 7, wherein a distance h10 between the rib and an end of each of the two rail members in a direction of movement of the polar liquid is set so as to satisfy the following inequality (1):

$$0.02 \times A \leq h10 \leq 0.17 \times A \quad (1)$$

where A represents a size of the pixel region in the direction of the movement of the polar liquid.

9. The display element according to claim 7, wherein a size h of each of the two rail members in a direction perpendicular to the first substrate and the second substrate is set so as to satisfy the following inequality (2):

$$0.65 \times H \leq h \leq H \quad (2)$$

where H represents a size of the polar liquid in the direction perpendicular to the first substrate and the second substrate.

10. The display element according to claim 1, comprising:
a signal voltage application portion that is connected to the plurality of the signal electrodes and applies a signal voltage in a predetermined voltage range to each of the plurality of the signal electrodes in accordance with information to be displayed on the display surface side;
a reference voltage application portion that is connected to the plurality of the reference electrodes and applies one of a selected voltage and a non-selected voltage to each of the plurality of the reference electrodes, the selected voltage allowing the polar liquid to move in the display space in accordance with the signal voltage and the non-selected voltage inhibiting a movement of the polar liquid in the display space; and
a scanning voltage application portion that is connected to the plurality of the scanning electrodes and applies one of a selected voltage and a non-selected voltage to each of the plurality of the scanning electrodes, the selected voltage allowing the polar liquid to move in the display space in accordance with the signal voltage and the non-selected voltage inhibiting a movement of the polar liquid in the display space.

11. The display element according to claim 1, wherein the plurality of the pixel regions are provided in accordance with a plurality of colors that enable full-color display to be shown on the display surface side.

12. The display element according to claim 2, comprising:
a signal voltage application portion that is connected to the plurality of the signal electrodes and applies a signal voltage in a predetermined voltage range to each of the plurality of the signal electrodes in accordance with information to be displayed on the display surface side;
a reference voltage application portion that is connected to the plurality of the reference electrodes and applies one of a selected voltage and a non-selected voltage to each of the plurality of the reference electrodes, the selected voltage allowing the polar liquid to move in the display space in accordance with the signal voltage and the non-selected voltage inhibiting a movement of the polar liquid in the display space; and
a scanning voltage application portion that is connected to the plurality of the scanning electrodes and applies one of a selected voltage and a non-selected voltage to each of the plurality of the scanning electrodes, the selected voltage allowing the polar liquid to move in the display space in accordance with the signal voltage and the non-selected voltage inhibiting a movement of the polar liquid in the display space.

13. The display element according to claim 2, wherein the plurality of the pixel regions are provided in accordance with a plurality of colors that enable full-color display to be shown on the display surface side.

14. An electric apparatus comprising a display portion that displays information including characters and images,
wherein the display portion comprises the display element according to claim 2.

15. The display element according to claim 1, wherein a dielectric layer is formed on the surfaces of the plurality of the reference electrodes and the plurality of the scanning electrodes.

16. An electric apparatus comprising a display portion that displays information including characters and images,
wherein the display portion comprises the display element according to claim 1.

17. A display element that comprises a first substrate provided on a display surface side, a second substrate provided on a non-display surface side of the first substrate so that a predetermined display space is formed between the first substrate and the second substrate, an effective display region and a non-effective display region that are defined with respect to the display space, and a polar liquid sealed in the display space so as to be moved toward the effective display region or the non-effective display region, and that is capable of changing a display color on the display surface side by moving the polar liquid,
wherein the display element comprises:
a plurality of signal electrodes that are placed in the display space so as to come into contact with the polar liquid, and are also provided along a predetermined arrangement direction;
a plurality of reference electrodes that are provided on one of the first substrate and the second substrate so as to be electrically insulated from the polar liquid and to be located on one of the effective display region side and the non-effective display region side, and are also arranged so as to intersect with the plurality of the signal electrodes;
a plurality of scanning electrodes that are provided on one of the first substrate and the second substrate so as to be electrically insulated from the polar liquid and the plurality of the reference electrodes and to be located on the other of the effective display region side and the non-effective display region side, and are also arranged so as to intersect with the plurality of the signal electrodes;
a plurality of pixel regions that are located at each of the intersections of the plurality of the signal electrodes and the plurality of the scanning electrodes;
a rib that is provided on at least one of the first substrate and the second substrate so as to hermetically divide an inside of the display space in accordance with each of the plurality of the pixel regions; and an insulating fluid that is not mixed with the polar liquid and is movably sealed in the display space for each of the plurality of the pixel regions,
wherein a movement s ace in which the insulating fluid is moved is provided in the display space for each of the plurality of the pixel regions,
wherein the non-effective display region is defined by a light-shielding layer that is provided on one of the first substrate and the second substrate, and
the effective display region is defined by an aperture formed in the light-shielding layer.

18. The display element according to claim 17, comprising:
a signal voltage application portion that is connected to the plurality of the signal electrodes and applies a signal voltage in a predetermined voltage range to each of the plurality of the signal electrodes in accordance with information to be displayed on the display surface side;
a reference voltage application portion that is connected to the plurality of the reference electrodes and applies one of a selected voltage and a non-selected voltage to each of the plurality of the reference electrodes, the selected voltage allowing the polar liquid to move in the display space in accordance with the signal voltage and the non-selected voltage inhibiting a movement of the polar liquid in the display space; and
a scanning voltage application portion that is connected to the plurality of the scanning electrodes and applies one of a selected voltage and a non-selected voltage to each of the plurality of the scanning electrodes, the selected voltage allowing the polar liquid to move in the display space in accordance with the signal voltage and the non-selected voltage inhibiting a movement of the polar liquid in the display space.

19. The display element according to claim 17, wherein the plurality of the pixel regions are provided in accordance with a plurality of colors that enable full-color display to be shown on the display surface side.

20. An electric apparatus comprising a display portion that displays information including characters and images,
wherein the display portion comprises the display element according to claim 17.

* * * * *